United States Patent
Park et al.

(10) Patent No.: US 11,381,829 B2
(45) Date of Patent: *Jul. 5, 2022

(54) IMAGE PROCESSING METHOD AND APPARATUS THEREFOR

(71) Applicant: LG ELECTRONICS INC., Seoul (KR)

(72) Inventors: Naeri Park, Seoul (KR); Junghak Nam, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1 day.

This patent is subject to a terminal disclaimer.

(21) Appl. No.: 16/325,091

(22) PCT Filed: Aug. 19, 2016

(86) PCT No.: PCT/KR2016/009209
§ 371 (c)(1),
(2) Date: Apr. 8, 2021

(87) PCT Pub. No.: WO2018/034373
PCT Pub. Date: Feb. 22, 2018

(65) Prior Publication Data
US 2021/0243461 A1    Aug. 5, 2021

(51) Int. Cl.
*H04N 19/44* (2014.01)
*H04N 19/137* (2014.01)
*H04N 19/119* (2014.01)
*H04N 19/105* (2014.01)
*H04N 19/159* (2014.01)
(Continued)

(52) U.S. Cl.
CPC .......... *H04N 19/44* (2014.11); *H04N 19/105* (2014.11); *H04N 19/119* (2014.11);
(Continued)

(58) Field of Classification Search
CPC .. H04N 19/105; H04N 19/119; H04N 19/137; H04N 19/157; H04N 19/159;
(Continued)

(56) References Cited

U.S. PATENT DOCUMENTS

| 2014/0133570 A1* | 5/2014 | Lee | ....................... H04N 19/593 |
| | | | 375/240.16 |
| 2014/0211850 A1* | 7/2014 | Zhang | ................... H04N 19/174 |
| | | | 375/240.12 |

(Continued)

FOREIGN PATENT DOCUMENTS

| KR | 10-2011-0126485 A | 11/2011 |
| KR | 10-2012-0011428 A | 2/2012 |

(Continued)

OTHER PUBLICATIONS

"Overview of the High Efficiency Video Coding (HEVC) Standard"— Gary J. Sullivan, Jens-Rainer Ohm, Woo-Jin Han, and Thomas Wiegand; IEEE Transactions On Circuits and Systems for Video Technology, vol. 22, No. 12, Dec. 2012. (Year: 2012).*

(Continued)

*Primary Examiner* — Mainul Hasan
(74) *Attorney, Agent, or Firm* — Dentons US LLP

(57) ABSTRACT

An image decoding method may include: deriving motion information of a first prediction unit determined by a first partitioning mode of a current block and motion information of a second prediction unit determined by a second partitioning mode of the current block; generating a prediction block of the first prediction unit by using the motion information of the first prediction unit and generating a prediction block of the second prediction unit by using the motion information of the second prediction unit; and generating a prediction block of the current block in units of sub-prediction unit determined by combining the first pre- (Continued)

diction unit and the second prediction unit by using the first prediction block and the second prediction block.

13 Claims, 21 Drawing Sheets

(51) Int. Cl.
*H04N 19/186* (2014.01)
*H04N 19/176* (2014.01)

(52) U.S. Cl.
CPC ......... *H04N 19/137* (2014.11); *H04N 19/159* (2014.11); *H04N 19/176* (2014.11); *H04N 19/186* (2014.11)

(58) Field of Classification Search
CPC .... H04N 19/176; H04N 19/186; H04N 19/44; H04N 19/577
See application file for complete search history.

(56) References Cited

U.S. PATENT DOCUMENTS

| | | | | |
|---|---|---|---|---|
| 2014/0328403 A1* | 11/2014 | Lim | ...................... | H04N 19/174 375/240.16 |
| 2015/0085935 A1* | 3/2015 | Chen | .................... | H04N 19/597 375/240.16 |
| 2018/0376137 A1* | 12/2018 | Jun | ...................... | H04N 19/147 |
| 2019/0158835 A1* | 5/2019 | Lee | ...................... | H04N 19/176 |
| 2019/0191155 A1* | 6/2019 | Ko | ........................ | H04N 19/105 |
| 2019/0222837 A1* | 7/2019 | Lee | ...................... | H04N 19/117 |
| 2019/0246133 A1* | 8/2019 | Lee | ........................ | H04N 19/44 |
| 2019/0289301 A1* | 9/2019 | Lim | ...................... | H04N 19/105 |

FOREIGN PATENT DOCUMENTS

| | | |
|---|---|---|
| KR | 10-2014-0095607 A | 8/2014 |
| KR | 10-2015-0093723 A | 8/2015 |
| KR | 10-2016-0045814 A | 4/2016 |

OTHER PUBLICATIONS

"Block Merging for Quadtree-Based Partitioning in HEVC"—Philipp Helle, Simon Oudin, Benjamin Brass, Detlev Marpe, M. Oguz Bici, Kemal Ugur, Joel Jung, Gordon Clare, and Thomas Wiegand; IEEE Transactions On Circuits and Systems for Video Technology, vol. 22, No. 12, Dec. 2012. (Year: 2012).*

* cited by examiner

[Fig. 1]
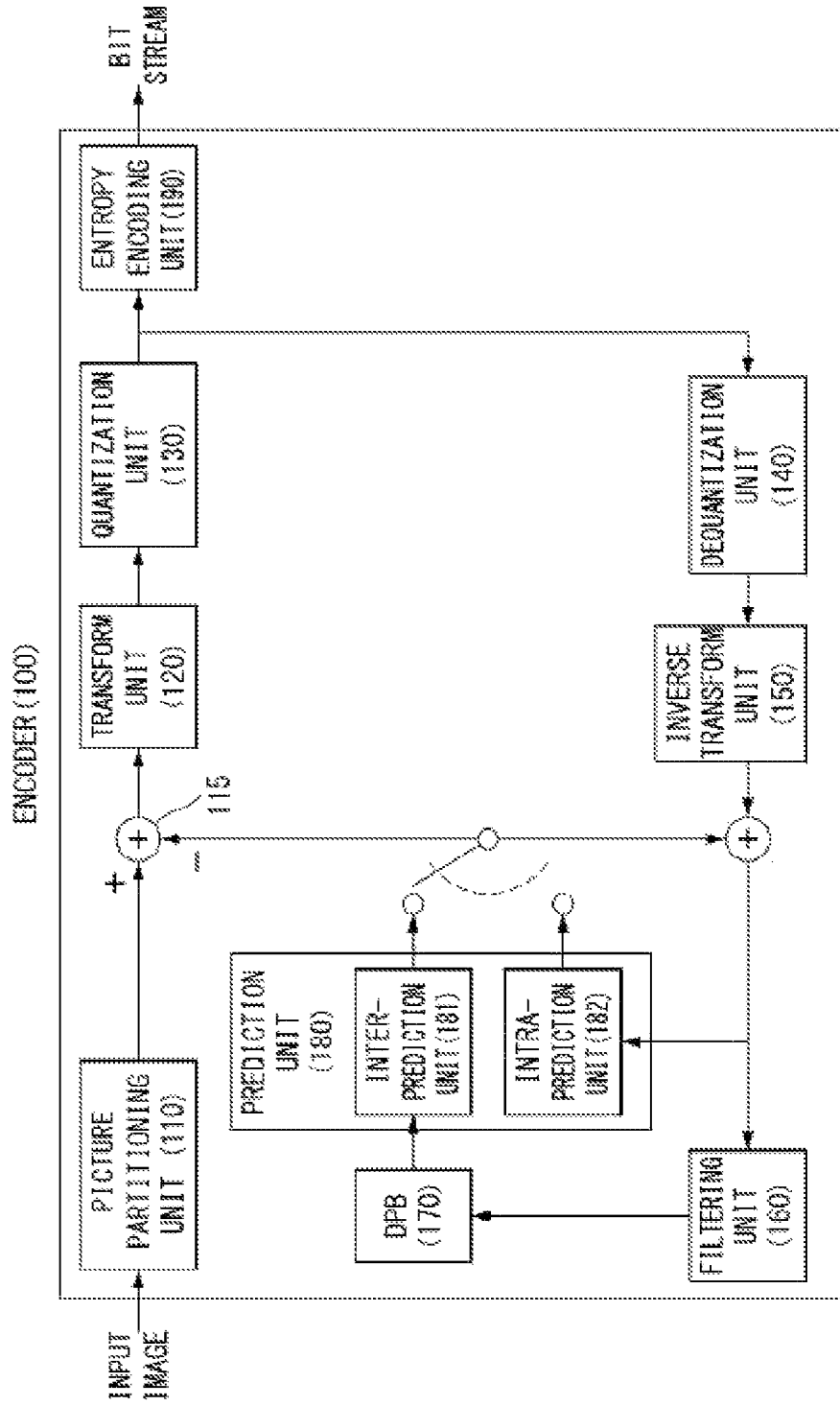

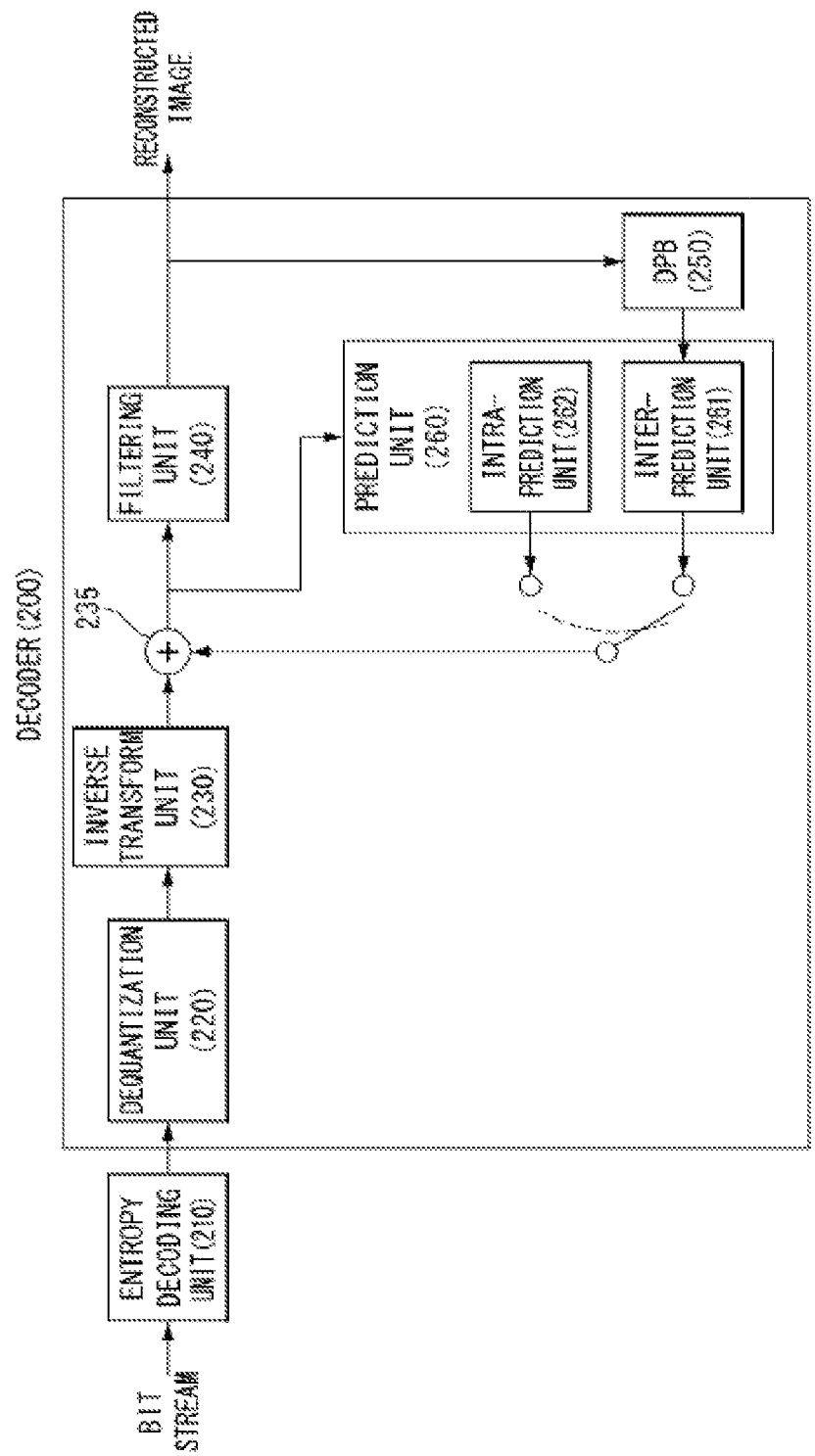
[Fig. 2]

[Fig. 3]
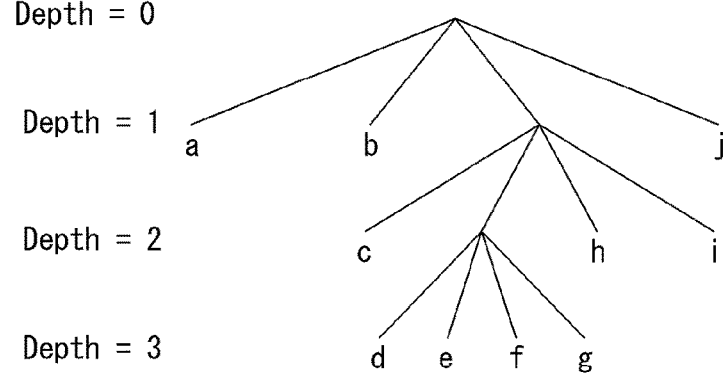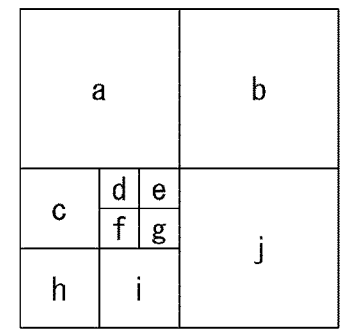
(A)          (B)

[Fig. 4]
Intra:
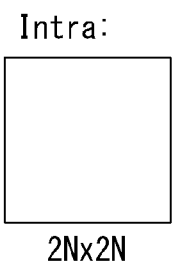 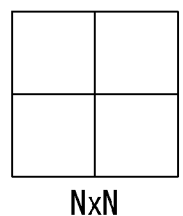
2Nx2N      NxN
Inter:
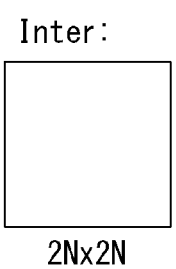 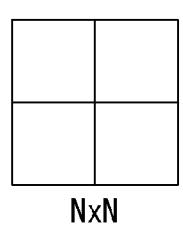 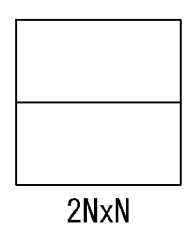 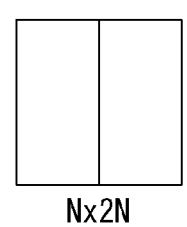
2Nx2N      NxN      2NxN      Nx2N
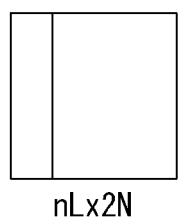 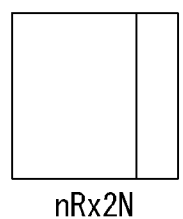 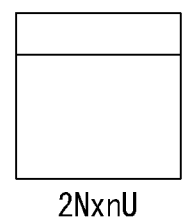 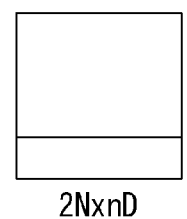
nLx2N      nRx2N      2NxnU      2NxnD

[Fig. 5]
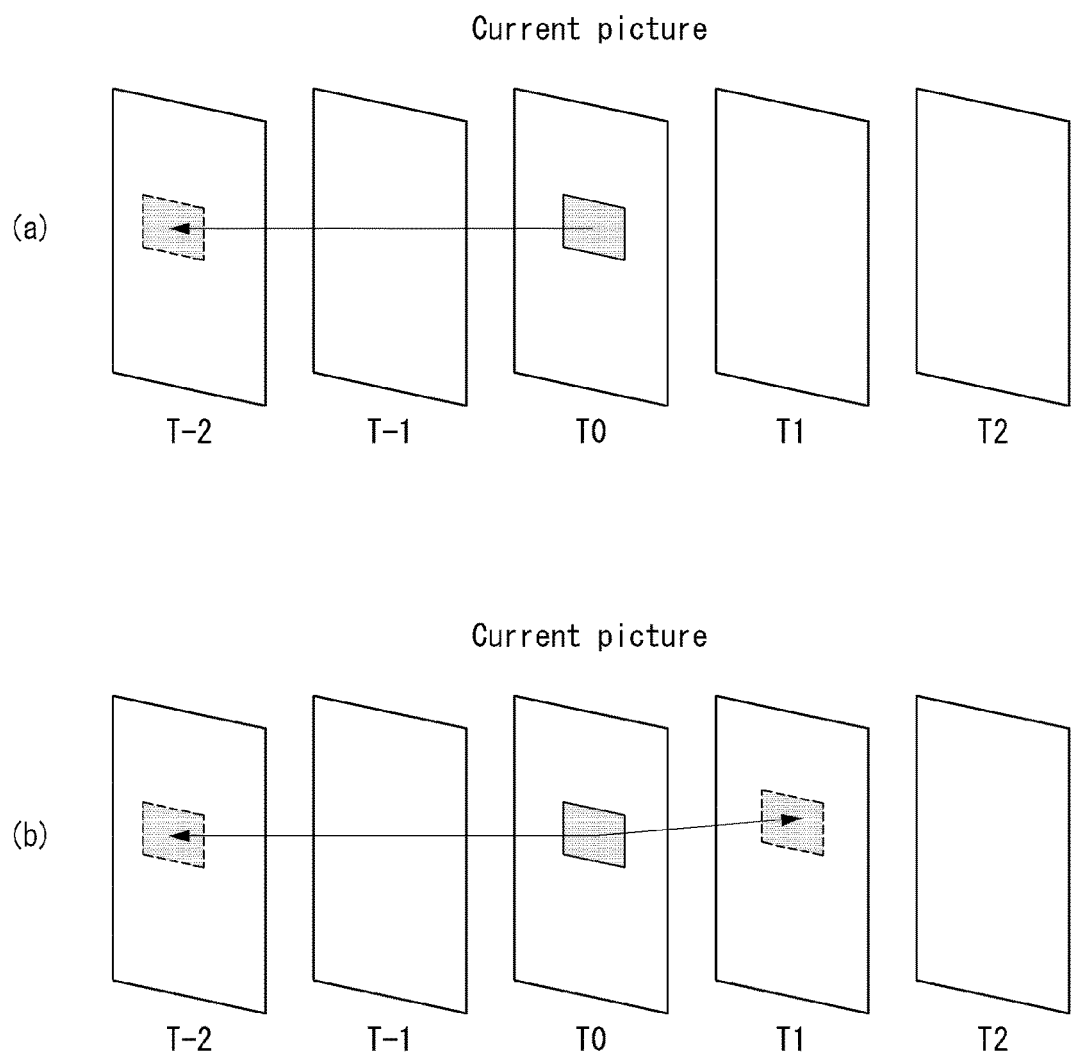

[Fig. 6]

[Fig. 7]
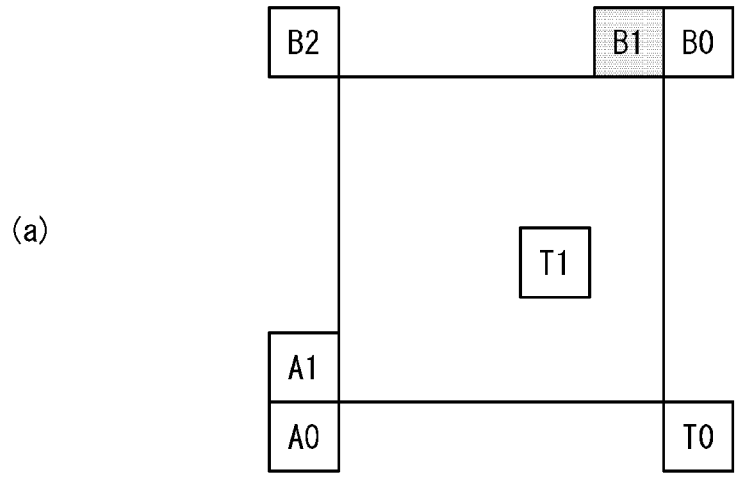

[Fig. 8]
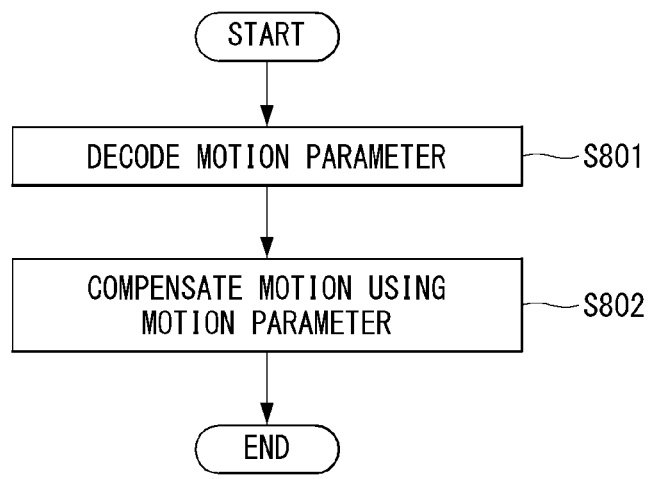

[Fig. 9]
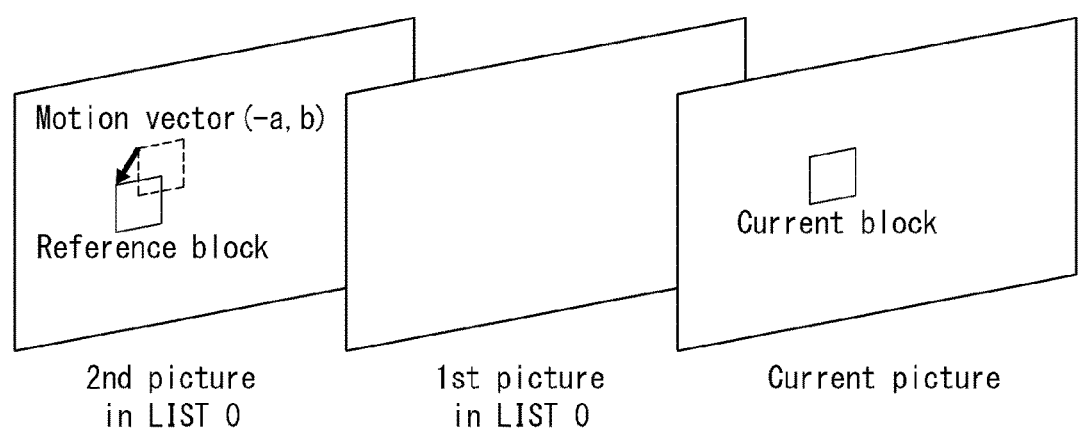

[Fig. 10]
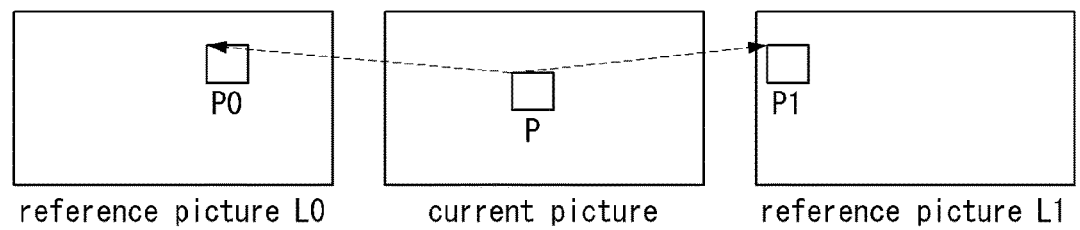

[Fig. 11]
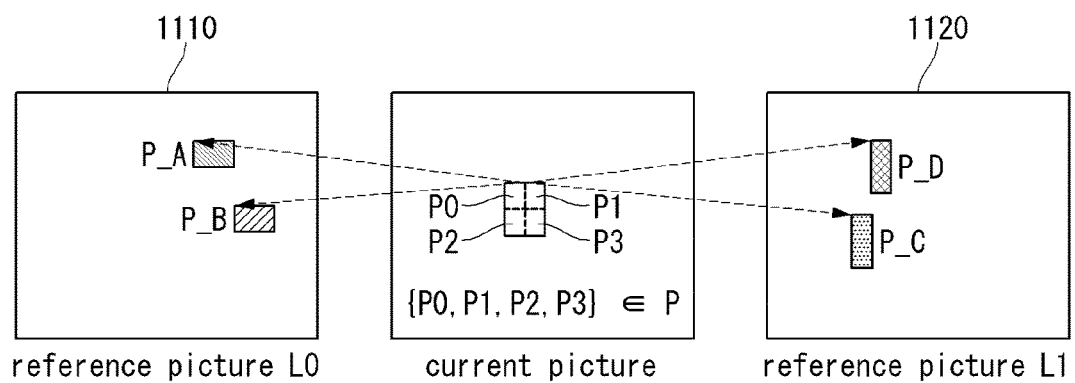

[Fig. 12]
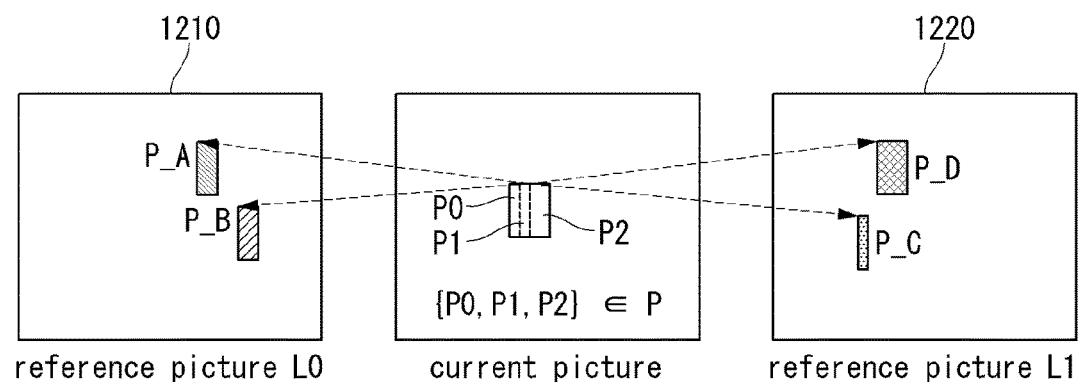

[Fig. 13]
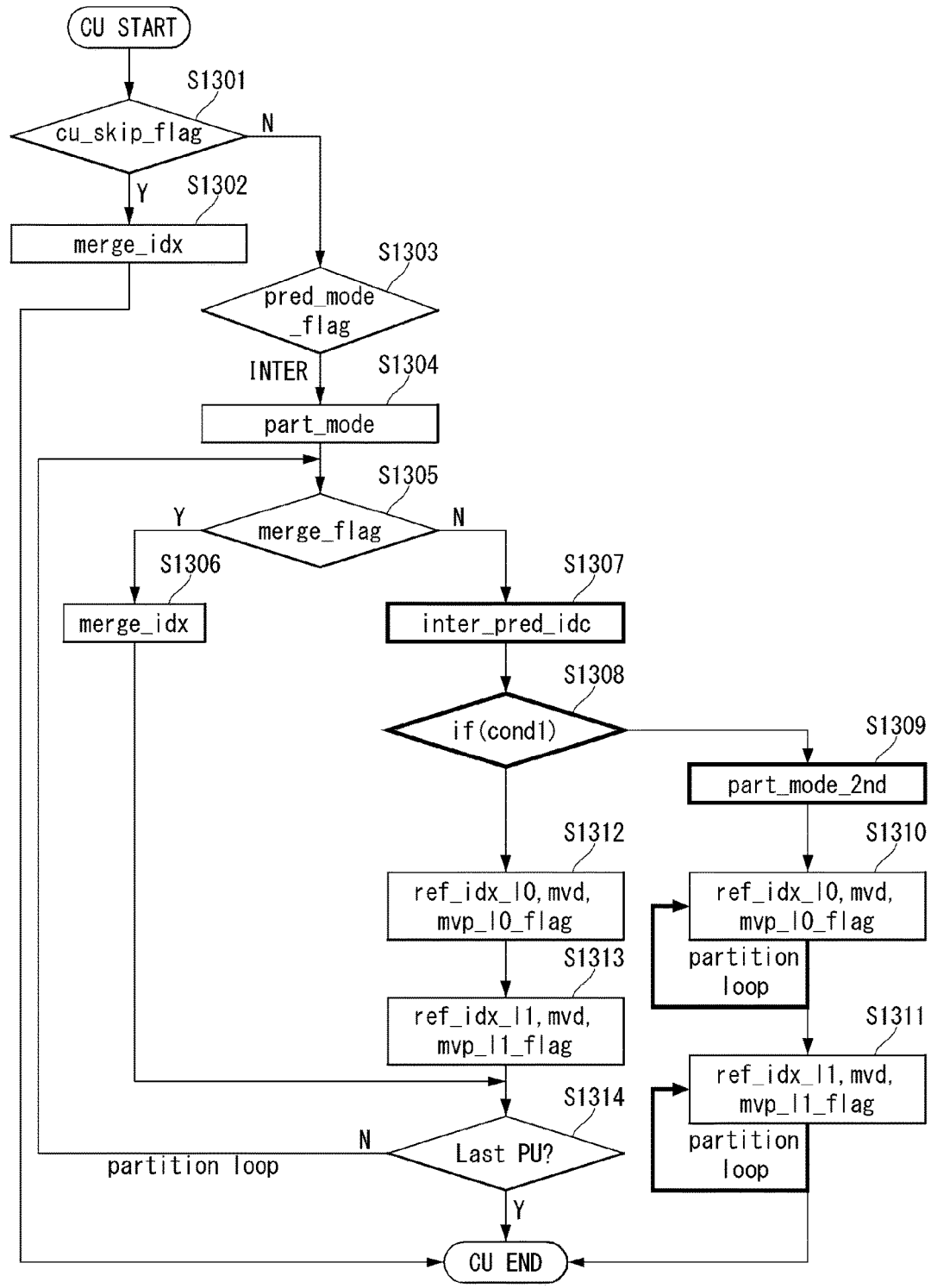

[Fig. 14]

[Fig. 15]

[Fig. 16]
(a) 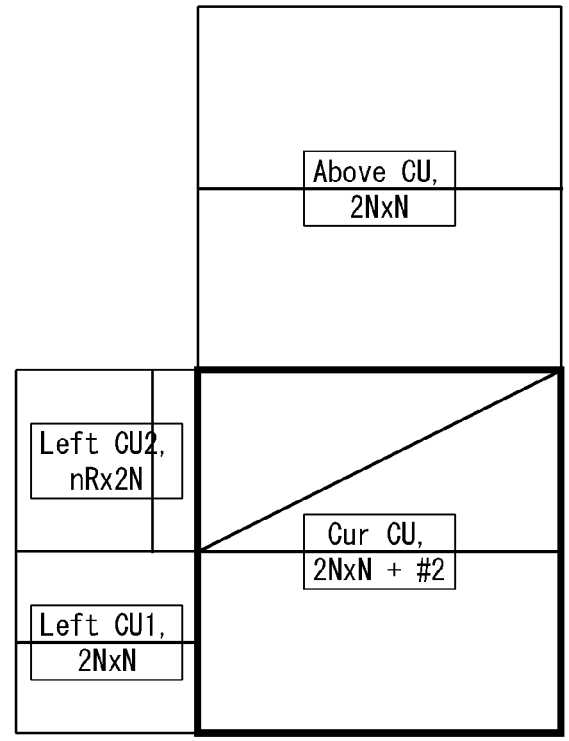
(b) 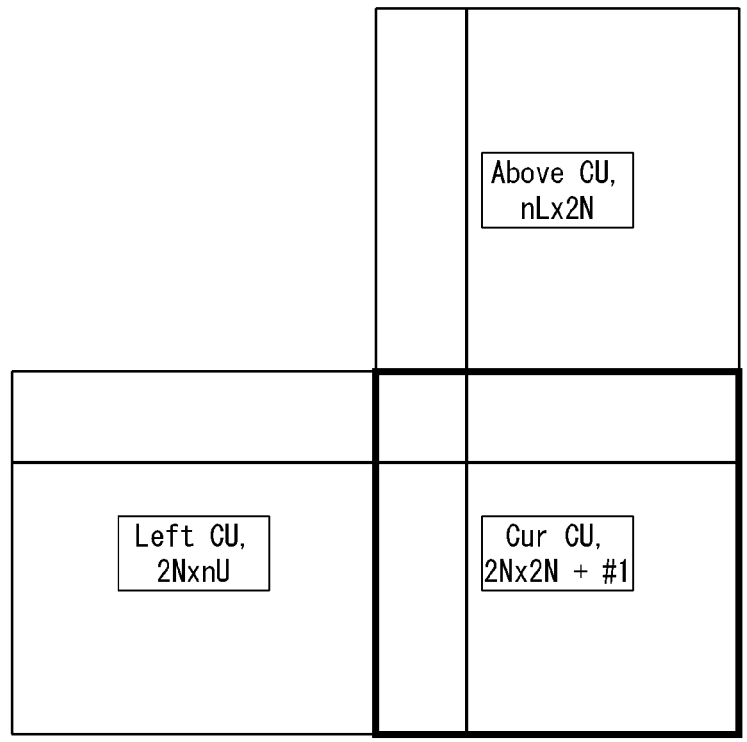

【Fig. 17】
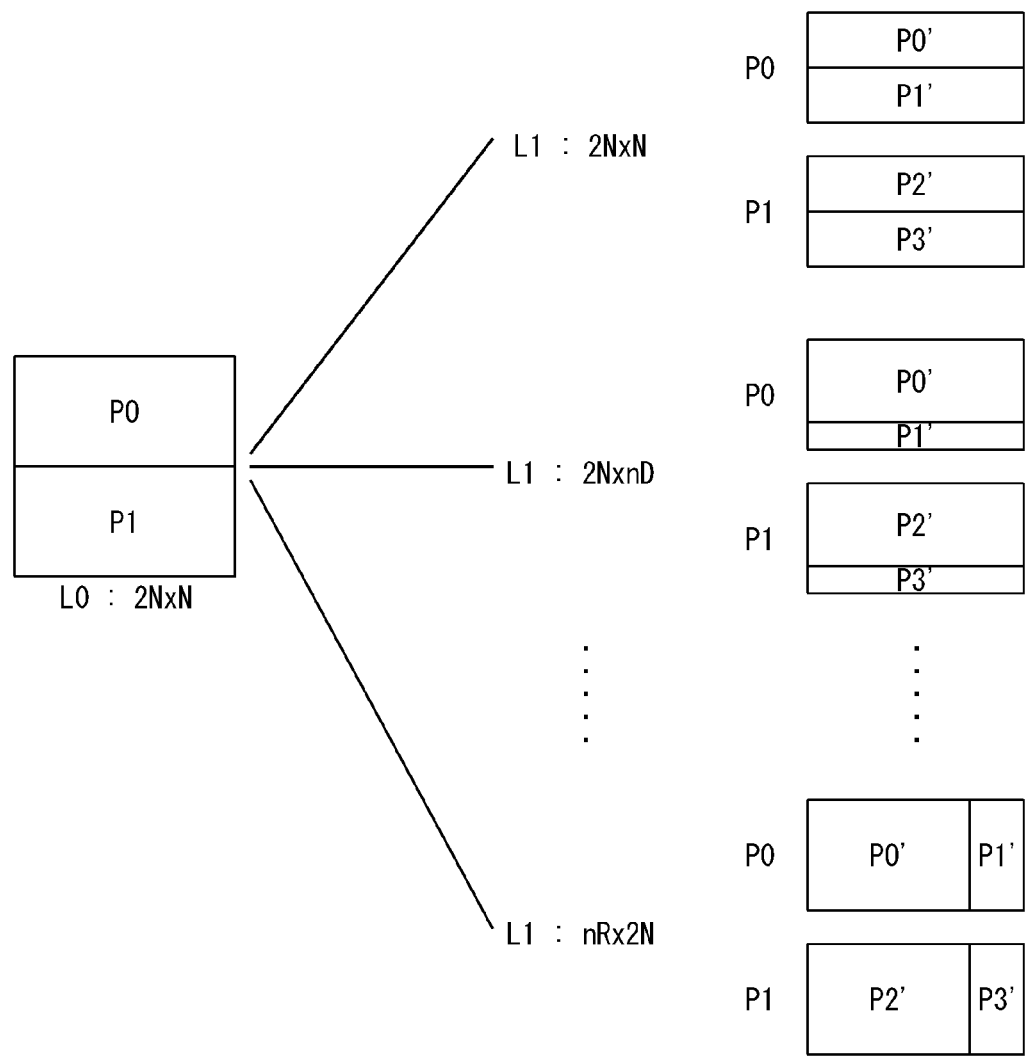

[Fig. 18]
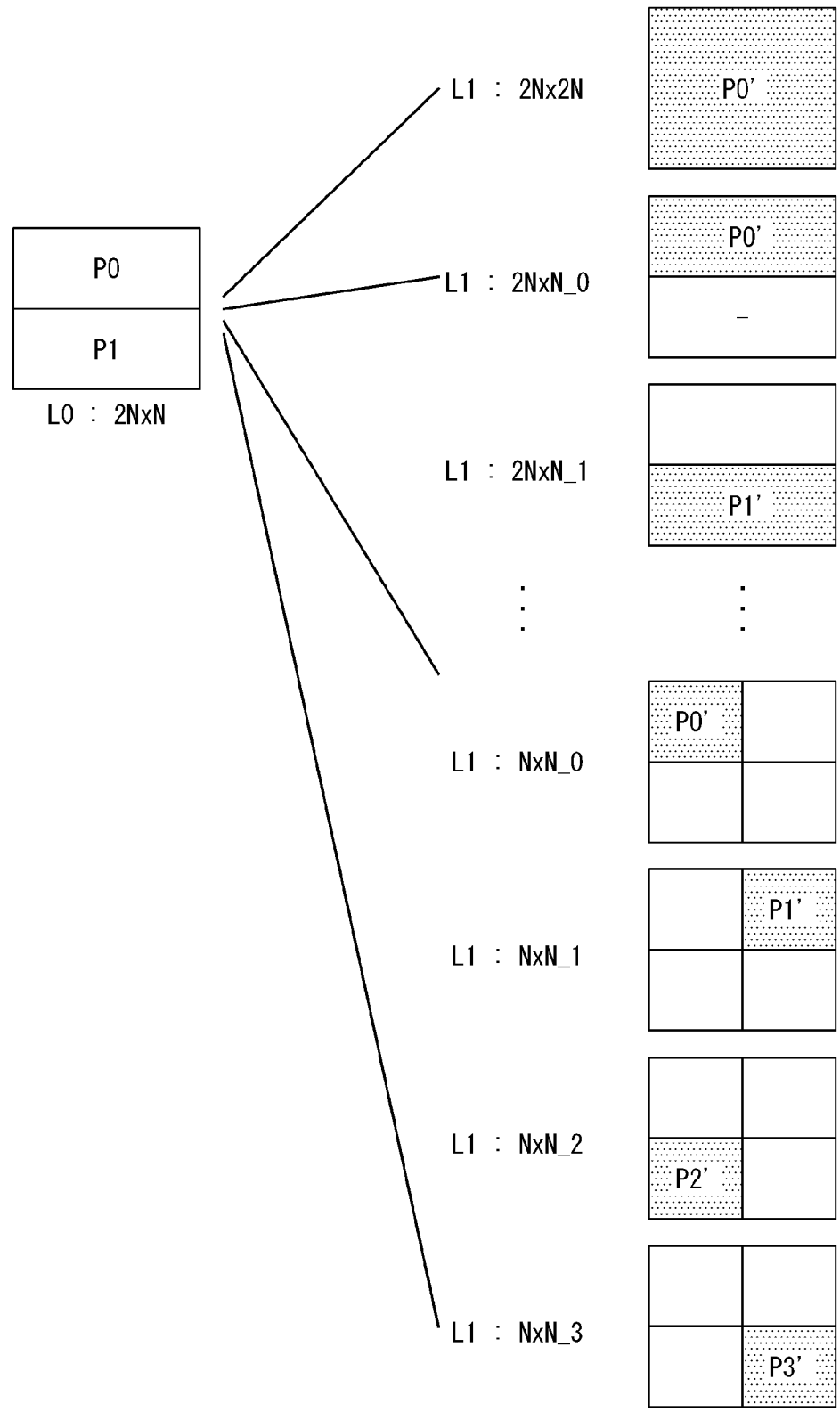

[Fig. 19]
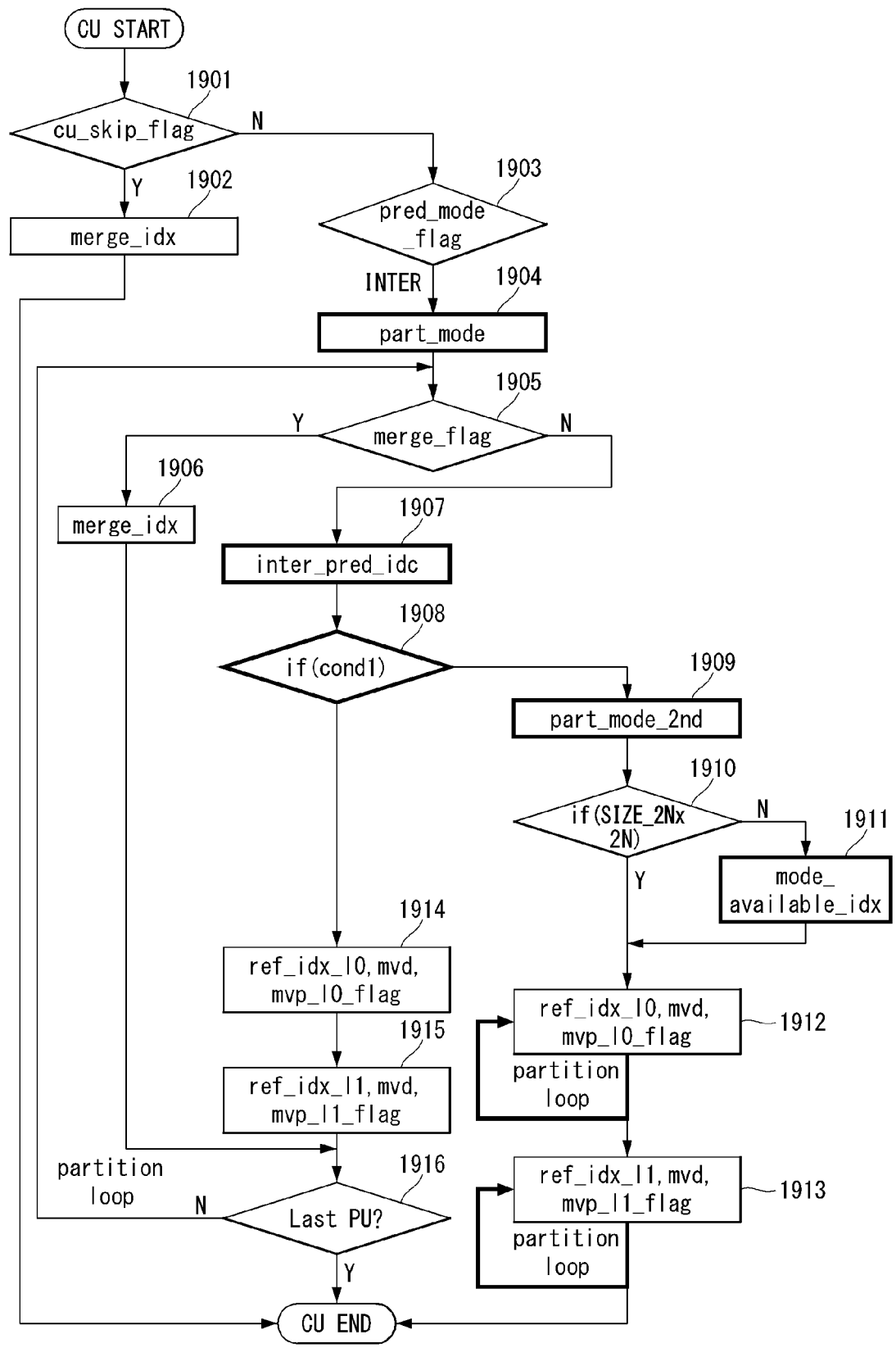

[Fig. 20]
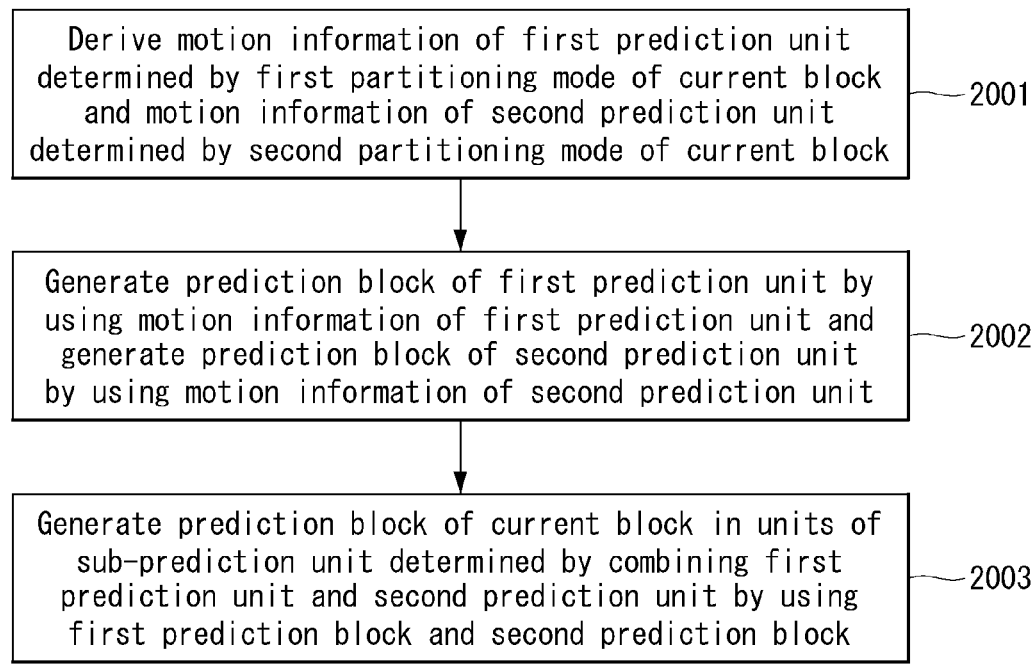

[Fig. 21]
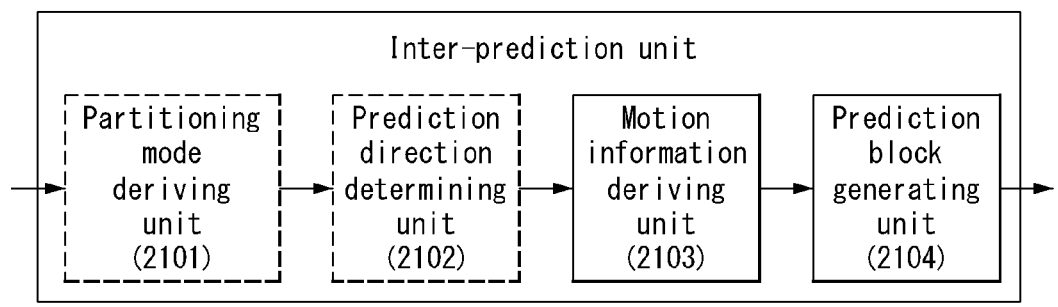

IMAGE PROCESSING METHOD AND APPARATUS THEREFOR

CROSS-REFERENCE TO RELATED APPLICATIONS

This application is the National Stage filing under 35 U.S.C. 371 of International Application No. PCT/KR2016/009209, filed on Aug. 19, 2016.

TECHNICAL FIELD

The present invention relates to a still image or moving image processing method, and more particularly, to a method for encoding/decoding a moving image based on an inter prediction mode and an apparatus for supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

In a moving image compression technique in the related art, a prediction block of the same type is averaged to generate a final prediction block when a bi-directional inter prediction is predicted. In this case, it is difficult to minimize a prediction error and compression performance is deteriorated due to splitting of a prediction unit and an increase of an additional information amount including motion information.

In order to solve the above problem, an embodiment of the present invention is to propose a method for performing an inter prediction by using a plurality of partitioning modes and a method for processing an image based thereon.

Furthermore, an embodiment of the present invention is to propose a method for performing an inter prediction by differently applying a partitioning mode of a prediction block for an inter-picture prediction according to each reference picture and a method for processing an image based thereon.

Furthermore, an embodiment of the present invention is to propose a method for defining a new type of partitioning mode when performing an inter prediction by differently applying a partitioning mode of a prediction block for an inter-picture prediction according to each reference picture and a method for processing an image based thereon.

The technical objects of the present invention are not limited to the aforementioned technical objects, and other technical objects, which are not mentioned above, will be apparently appreciated by a person having ordinary skill in the art from the following description.

Technical Solution

In an aspect of the present invention, an image decoding method may include: deriving motion information of a first prediction unit determined by a first partitioning mode of a current block and motion information of a second prediction unit determined by a second partitioning mode of the current block; generating a prediction block of the first prediction unit by using the motion information of the first prediction unit and generating a prediction block of the second prediction unit by using the motion information of the second prediction unit; and generating a prediction block of the current block in units of sub-prediction unit determined by combining the first prediction unit and the second prediction unit by using the first prediction block and the second prediction block, in which a most probable mode (MPM) list for the second partitioning mode may be configured according to the first partitioning mode, and the second partitioning mode may be determined within the MPM list.

In an aspect of the present invention, an image decoding apparatus may include: a motion information deriving unit deriving motion information of a first prediction unit determined by a first partitioning mode of a current block and motion information of a second prediction unit determined by a second partitioning mode of the current block; and a prediction block generating unit generating a prediction block of the first prediction unit by using the motion information of the first prediction unit and generating a prediction block of the second prediction unit by using the motion information of the second prediction unit and generating a prediction block of the current block in units of sub-prediction unit determined by combining the first prediction unit and the second prediction unit by using the first prediction block and the second prediction block, in which a most probable mode (MPM) list for the second partitioning mode may be configured according to the first partitioning mode, and the second partitioning mode may be determined within the MPM list.

Preferably, a type and/or an order of a partitioning mode included the MPM list may be determined according to at least any one of the first partitioning mode of the current block, the first partitioning mode of a neighbor block of the current block, and the second partitioning mode of the neighbor block of the current block.

Preferably, a candidate partitioning mode for the second partitioning mode may be limited to a smaller number than the candidate partitioning mode for the first partitioning mode.

Preferably, the first partitioning mode may be any one of 2N×2N, 2N×N, N×2N, N×N, 2N×nU, 2N×nD, nL×2N, and nR×2N and the second partitioning mode is any one of partitioning modes different from the first partitioning mode.

Preferably, the MPM list may include a predetermined partitioning mode N_mode, and the N_mode may be a partitioning mode to partition a block using a line segment connecting one or more points among vertexes of the current block and one or more points determined on a side of the current block according to the first partitioning mode.

Preferably, the MPM list may include a predetermined partitioning mode N_mode, and the N_mode may be a partitioning mode to partition a block by using at least one of partitioning lines of the current block according to the first partitioning mode and one additional partitioning line.

Preferably, the second partitioning mode may be determined so that a width of a block partitioned from the current block is the same as that of the neighbor block adjacent to an upper side of the current block and a height of the block partitioned from the current block is the same as that of the neighbor block adjacent to a left side of the current block.

Preferably, each of the blocks partitioned according to the first partitioning mode from the current block may be partitioned by the second partitioning mode.

Preferably, the second partitioning mode may indicate a block in which bi-directional prediction is available among the blocks partitioned according to a partitioning type of the current block and the second partitioning mode.

Preferably, the first partitioning mode may indicate a partitioning mode for a reference picture in which a distance between a current picture and a reference picture is relatively small and the second partitioning mode indicates a partitioning mode for a reference picture in which the distance between the current picture and the reference picture is relatively large.

Preferably, the second partitioning mode applied to a luma component and a chroma component of the current block may be independently determined.

Advantageous Effects

According to an embodiment of the present invention, by generating prediction blocks of various shapes by applying a plurality of different partitioning modes for each reference picture, a prediction error is reduced to enhance compression performance.

Further, according to an embodiment of the present invention, the plurality of different partitioning modes is applied for each reference picture to reduce additional information generated due to splitting into small coding units in the related art, thereby enhancing the compression performance.

Advantages which can be obtained in the present invention are not limited to the aforementioned effects and other unmentioned advantages will be clearly understood by those skilled in the art from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 is a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 is an embodiment to which the present invention may be applied and is a diagram illustrating the direction of inter-prediction.

FIG. 6 is an embodiment to which the present invention may be applied and illustrates integers for 1/4 sample interpolation and fraction sample locations.

FIG. 7 is an embodiment to which the present invention may be applied and illustrates the location of a spatial candidate.

FIG. 8 is an embodiment to which the present invention is applied and is a diagram illustrating an inter-prediction method.

FIG. 9 is an embodiment to which the present invention may be applied and is a diagram illustrating a motion compensation process.

FIG. 10 is a diagram illustrating a bi-directional inter prediction to which a single partitioning mode is applied.

FIG. 11 is a diagram illustrating a method for generating a prediction block by applying a different partitioning mode for each reference picture according to an embodiment of the present invention.

FIG. 12 is a diagram illustrating a method for generating a prediction block by applying a different partitioning mode for each reference picture according to an embodiment of the present invention.

FIG. 13 is a diagram illustrating a method for parsing a syntax element of a coding unit from a bitstream according to an embodiment of the present invention.

FIG. 14 illustrates a new partitioning mode N_mode of a second partitioning mode depending on a first partitioning mode according to an embodiment of the present invention.

FIG. 15 illustrates a new partitioning mode N_mode of a second partitioning mode depending on a first partitioning mode according to an embodiment of the present invention.

FIG. 16 is a diagram illustrating a method for selecting a new mode N_mode according to an embodiment of the present invention.

FIG. 17 illustrates part_mode_2nd according to an embodiment of the present invention.

FIG. 18 illustrates part_mode_2nd according to an embodiment of the present invention.

FIG. 19 is a diagram illustrating a method for parsing a syntax element of a coding unit from a bitstream according to an embodiment of the present invention.

FIG. 20 is a diagram illustrating an inter prediction method according to an embodiment of the present invention.

FIG. 21 is a diagram illustrating an inter prediction unit according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in this specification, a "processing unit" means a unit in which an encoding/decoding processing process, such as prediction, transform and/or quantization, is performed. Hereinafter, for convenience of description, a processing unit may also be called "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PU) or transform block (TB) for a chroma component. Also, the present invention is not limited to this, and the processing unit may be interpreted to include a unit for the luma component and a unit for the chroma component.

Furthermore, a processing unit is not essentially limited to a square block and may be constructed in a polygon form having three or more vertices.

FIG. 1 is a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequantization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy.

In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring to the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Next, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

Processing Unit Split Structure

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(*b*), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(*b*), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(*b*), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means 1/4 value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(*b*), a TU(c), a TU(h) and a TU(i) corresponding to the node c, h and I have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(*b*), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Prediction

In order to reconstruct a current processing unit on which decoding is performed, the decoded part of a current picture or other pictures including the current processing unit may be used.

A picture (slice) using only a current picture for reconstruction, that is, on which only intra-prediction is performed, may be called an intra-picture or I picture (slice), a picture (slice) using a maximum of one motion vector and reference index in order to predict each unit may be called a predictive picture or P picture (slice), and a picture (slice) using a maximum of two motion vector and reference indices may be called a bi-predictive picture or B a picture (slice).

Intra-prediction means a prediction method of deriving a current processing block from the data element (e.g., a sample value) of the same decoded picture (or slice). That is, intra-prediction means a method of predicting the pixel value of a current processing block with reference to reconstructed regions within a current picture.

Hereinafter, inter-prediction is described in more detail.

Inter-Prediction (or Inter-Frame Prediction)

Inter-prediction means a prediction method of deriving a current processing block based on the data element (e.g., sample value or motion vector) of a picture other than a current picture. That is, inter-prediction means a method of predicting the pixel value of a current processing block with reference to reconstructed regions within another reconstructed picture other than a current picture.

Inter-prediction (or inter-picture prediction) is a technology for removing redundancy present between pictures and is chiefly performed through motion estimation and motion compensation.

FIG. 5 is an embodiment to which the present invention may be applied and is a diagram illustrating the direction of inter-prediction.

Referring to FIG. 5, inter-prediction may be divided into uni-direction prediction in which only one past picture or future picture is used as a reference picture on a time axis with respect to a single block and bi-directional prediction in which both the past and future pictures are referred at the same time.

Furthermore, the uni-direction prediction may be divided into forward direction prediction in which a single reference picture temporally displayed (or output) prior to a current picture is used and backward direction prediction in which a single reference picture temporally displayed (or output) after a current picture is used.

In the inter-prediction process (i.e., uni-direction or bi-directional prediction), a motion parameter (or information) used to specify which reference region (or reference block) is used in predicting a current block includes an inter-prediction mode (in this case, the inter-prediction mode may indicate a reference direction (i.e., uni-direction or bi-direction) and a reference list (i.e., L0, L1 or bi-directional)), a reference index (or reference picture index or reference list index), and motion vector information. The motion vector information may include a motion vector, motion vector prediction (MVP) or a motion vector difference (MVD). The motion vector difference means a difference between a motion vector and a motion vector predictor.

In the uni-direction prediction, a motion parameter for one-side direction is used. That is, one motion parameter may be necessary to specify a reference region (or reference block).

In the bi-directional prediction, a motion parameter for both directions is used. In the bi-directional prediction method, a maximum of two reference regions may be used. The two reference regions may be present in the same reference picture or may be present in different pictures. That is, in the bi-directional prediction method, a maximum of two motion parameters may be used. Two motion vectors may have the same reference picture index or may have different reference picture indices. In this case, the reference pictures may be displayed temporally prior to a current picture or may be displayed (or output) temporally after a current picture.

The encoder performs motion estimation in which a reference region most similar to a current processing block is searched for in reference pictures in an inter-prediction process. Furthermore, the encoder may provide the decoder with a motion parameter for a reference region.

The encoder/decoder may obtain the reference region of a current processing block using a motion parameter. The reference region is present in a reference picture having a reference index. Furthermore, the pixel value or interpolated value of a reference region specified by a motion vector may be used as the predictor of a current processing block. That is, motion compensation in which an image of a current processing block is predicted from a previously decoded picture is performed using motion information.

In order to reduce the transfer rate related to motion vector information, a method of obtaining a motion vector difference (mvd) using motion information of previously decoded blocks and transmitting only the corresponding difference (mvd) may be used. That is, the decoder calculates the motion vector predictor of a current processing block using motion information of other decoded blocks and obtains a motion vector value for the current processing block using a difference from the encoder. In obtaining the motion vector predictor, the decoder may obtain various motion vector candidate values using motion information of other already decoded blocks, and may obtain one of the various motion vector candidate values as a motion vector predictor.

—Reference Picture Set and Reference Picture List

In order to manage multiple reference pictures, a set of previously decoded pictures are stored in the decoded picture buffer (DPB) for the decoding of the remaining pictures.

A reconstructed picture that belongs to reconstructed pictures stored in the DPB and that is used for inter-prediction is called a reference picture. In other words, a reference picture means a picture including a sample that may be used for inter-prediction in the decoding process of a next picture in a decoding sequence.

A reference picture set (RPS) means a set of reference pictures associated with a picture, and includes all of previously associated pictures in the decoding sequence. A reference picture set may be used for the inter-prediction of an associated picture or a picture following a picture in the decoding sequence. That is, reference pictures retained in the decoded picture buffer (DPB) may be called a reference picture set. The encoder may provide the decoder with a sequence parameter set (SPS) (i.e., a syntax structure having a syntax element) or reference picture set information in each slice header.

A reference picture list means a list of reference pictures used for the inter-prediction of a P picture (or slice) or a B picture (or slice). In this case, the reference picture list may be divided into two reference pictures lists, which may be called a reference picture list 0 (or L0) and a reference picture list 1 (or L1). Furthermore, a reference picture belonging to the reference picture list 0 may be called a reference picture 0 (or L0 reference picture), and a reference picture belonging to the reference picture list 1 may be called a reference picture 1 (or L1 reference picture).

In the decoding process of the P picture (or slice), one reference picture list (i.e., the reference picture list 0). In the decoding process of the B picture (or slice), two reference pictures lists (i.e., the reference picture list 0 and the reference picture list 1) may be used. Information for distinguishing between such reference picture lists for each reference picture may be provided to the decoder through reference picture set information. The decoder adds a reference picture to the reference picture list 0 or the reference picture list 1 based on reference picture set information.

In order to identify any one specific reference picture within a reference picture list, a reference picture index (or reference index) is used.

—Fractional Sample Interpolation

A sample of a prediction block for an inter-predicted current processing block is obtained from the sample value of a corresponding reference region within a reference picture identified by a reference picture index. In this case, a corresponding reference region within a reference picture indicates the region of a location indicated by the horizontal component and vertical component of a motion vector. Fractional sample interpolation is used to generate a prediction sample for non-integer sample coordinates except a case where a motion vector has an integer value. For example, a motion vector of 1/4 scale of the distance between samples may be supported.

In the case of HEVC, fractional sample interpolation of a luma component applies an 8 tab filter in the traverse direction and longitudinal direction. Furthermore, the fractional sample interpolation of a chroma component applies a 4 tab filter in the traverse direction and the longitudinal direction.

Figure 6:
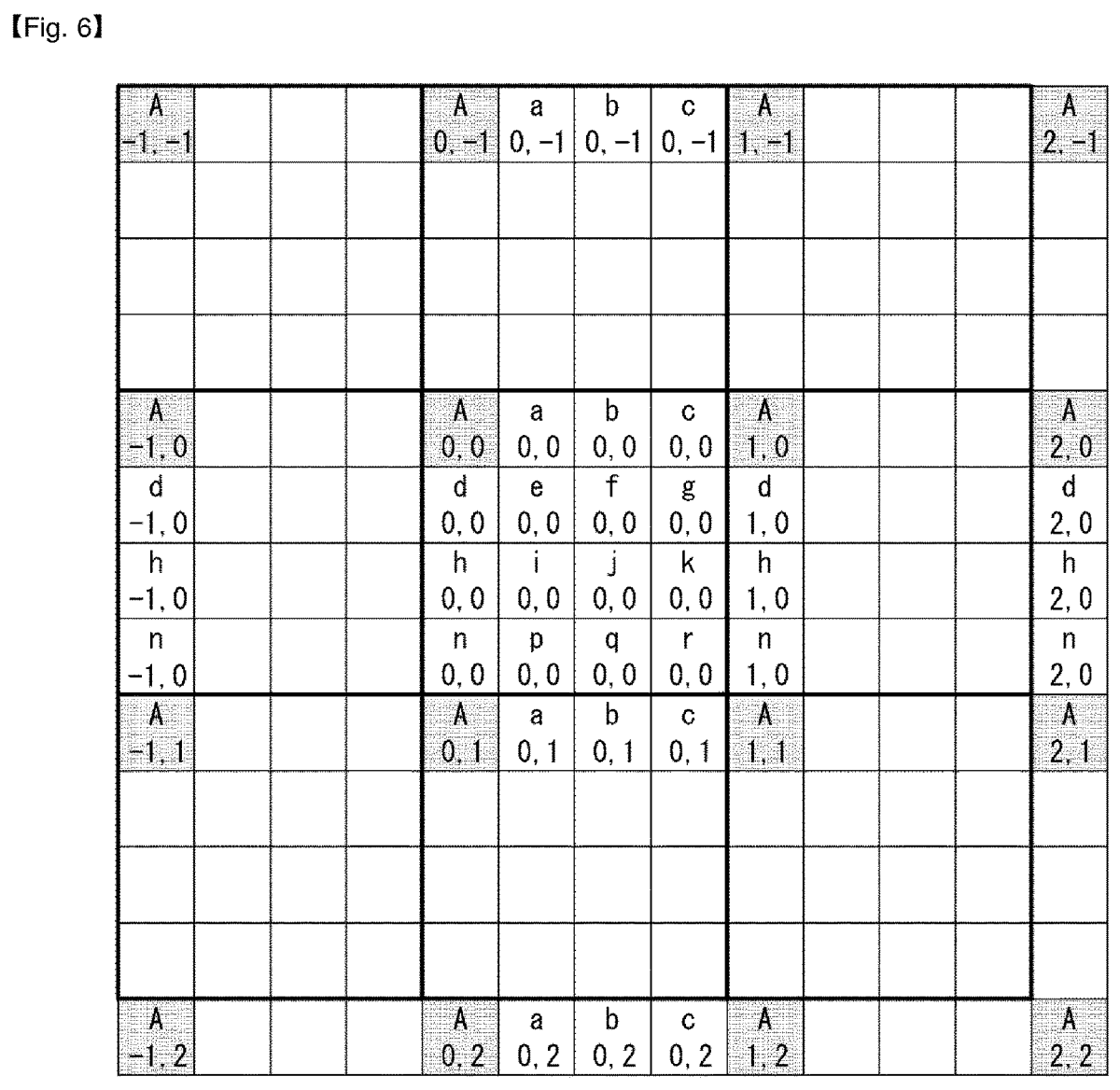

FIG. 6 is an embodiment to which the present invention may be applied and illustrates integers for 1/4 sample interpolation and fraction sample locations.

Referring to FIG. 6, a shadow block in which an upper-case letter (A_i,j) is written indicates an integer sample location, and a block not having a shadow in which a lower-case letter (x_i,j) is written indicates a fraction sample location.

A fraction sample is generated by applying an interpolation filter to an integer sample value in the horizontal direction and the vertical direction. For example, in the case of the horizontal direction, the 8 tab filter may be applied to four integer sample values on the left side and four integer sample values on the right side based on a fraction sample to be generated.

—Inter-Prediction Mode

In HEVC, in order to reduce the amount of motion information, a merge mode and advanced motion vector prediction (AMVP) may be used.

1) Merge Mode

The merge mode means a method of deriving a motion parameter (or information) from a spatially or temporally neighbor block.

In the merge mode, a set of available candidates includes spatially neighbor candidates, temporal candidates and generated candidates.

FIG. 7 is an embodiment to which the present invention may be applied and illustrates the location of a spatial candidate.

Referring to FIG. 7(a), whether each spatial candidate block is available depending on the sequence of {A1, B1, B0, A0, B2} is determined. In this case, if a candidate block is not encoded in the intra-prediction mode and motion information is present or if a candidate block is located out of a current picture (or slice), the corresponding candidate block cannot be used.

After the validity of a spatial candidate is determined, a spatial merge candidate may be configured by excluding an unnecessary candidate block from the candidate block of a current processing block. For example, if the candidate block of a current prediction block is a first prediction block within the same coding block, candidate blocks having the same motion information other than a corresponding candidate block may be excluded.

When the spatial merge candidate configuration is completed, a temporal merge candidate configuration process is performed in order of {T0, T1}.

In a temporal candidate configuration, if the right bottom block T0 of a collocated block of a reference picture is available, the corresponding block is configured as a temporal merge candidate. The collocated block means a block present in a location corresponding to a current processing block in a selected reference picture. In contrast, if not, a block T1 located at the center of the collocated block is configured as a temporal merge candidate.

A maximum number of merge candidates may be specified in a slice header. If the number of merge candidates is greater than the maximum number, a spatial candidate and temporal candidate having a smaller number than the maximum number are maintained. If not, the number of additional merge candidates (i.e., combined bi-predictive merging candidates) is generated by combining candidates added so far until the number of candidates becomes the maximum number.

The encoder configures a merge candidate list using the above method, and signals candidate block information, selected in a merge candidate list by performing motion estimation, to the decoder as a merge index (e.g., merge_idx [x0][y0]'). FIG. 7(b) illustrates a case where a B1 block has been selected from the merge candidate list. In this case, an "index 1 (Index 1)" may be signaled to the decoder as a merge index.

The decoder configures a merge candidate list like the encoder, and derives motion information about a current prediction block from motion information of a candidate block corresponding to a merge index from the encoder in the merge candidate list. Furthermore, the decoder generates a prediction block for a current processing block based on the derived motion information (i.e., motion compensation).

2) Advanced Motion Vector Prediction (AMVP) Mode

The AMVP mode means a method of deriving a motion vector predictor from a neighbor block. Accordingly, a horizontal and vertical motion vector difference (MVD), a reference index and an inter-prediction mode are signaled to the decoder. Horizontal and vertical motion vector values are calculated using the derived motion vector predictor and a motion vector difference (MVDP) provided by the encoder.

That is, the encoder configures a motion vector predictor candidate list, and signals a motion reference flag (i.e., candidate block information) (e.g., mvp_IX_flag[x0][y0]'), selected in motion vector predictor candidate list by performing motion estimation, to the decoder. The decoder configures a motion vector predictor candidate list like the encoder, and derives the motion vector predictor of a current processing block using motion information of a candidate block indicated by a motion reference flag received from the encoder in the motion vector predictor candidate list. Furthermore, the decoder obtains a motion vector value for the current processing block using the derived motion vector predictor and a motion vector difference transmitted by the encoder. Furthermore, the decoder generates a prediction block for the current processing block based on the derived motion information (i.e., motion compensation).

In the case of the AMVP mode, two spatial motion candidates of the five available candidates in FIG. 7 are selected. The first spatial motion candidate is selected from a {A0, A1} set located on the left side, and the second spatial motion candidate is selected from a {B0, B1, B2} set located at the top. In this case, if the reference index of a neighbor candidate block is not the same as a current prediction block, a motion vector is scaled.

If the number of candidates selected as a result of search for spatial motion candidates is 2, a candidate configuration is terminated. If the number of selected candidates is less than 2, a temporal motion candidate is added.

FIG. 8 is an embodiment to which the present invention is applied and is a diagram illustrating an inter-prediction method.

Referring to FIG. 8, the decoder (in particular, the inter-prediction unit 261 of the decoder in FIG. 2) decodes a motion parameter for a processing block (e.g., a prediction unit) (S801).

For example, if the merge mode has been applied to the processing block, the decoder may decode a merge index signaled by the encoder. Furthermore, the motion parameter of the current processing block may be derived from the motion parameter of a candidate block indicated by the merge index.

Furthermore, if the AMVP mode has been applied to the processing block, the decoder may decode a horizontal and vertical motion vector difference (MVD), a reference index and an inter-prediction mode signaled by the encoder. Furthermore, the decoder may derive a motion vector predictor from the motion parameter of a candidate block indicated by a motion reference flag, and may derive the motion vector value of a current processing block using the motion vector predictor and the received motion vector difference.

The decoder performs motion compensation on a prediction unit using the decoded motion parameter (or information) (S802).

That is, the encoder/decoder performs motion compensation in which an image of a current unit is predicted from a previously decoded picture using the decoded motion parameter.

FIG. 9 is an embodiment to which the present invention may be applied and is a diagram illustrating a motion compensation process.

FIG. 9 illustrates a case where a motion parameter for a current block to be encoded in a current picture is uni-direction prediction, a second picture within LIST0, LIST0, and a motion vector (−a, b).

In this case, as in FIG. 9, the current block is predicted using the values (i.e., the sample values of a reference block) of a location (−a, b) spaced apart from the current block in the second picture of LIST0.

In the case of bi-directional prediction, another reference list (e.g., LIST1), a reference index and a motion vector difference are transmitted. The decoder derives two reference blocks and predicts a current block value based on the two reference blocks.

Inter Prediction-Based Image Processing Method

As the resolution and the complexity of the image have been diversified, prediction blocks having various sizes and shapes have appeared as a method for efficiently compressing the image.

Referring again to FIG. 4 above, the size of the prediction bloc has been diversified from 64×64 to 4×4 in order to reduce a prediction error and in particular, in an inter prediction mode, partitioning modes such as 2N×2N, 2N×N, N×2N, and N×N which are the conventional prediction block shapes and partitioning modes such as 2N×nU, 2N×nD, nL×2N, and nR×2N which are asymmetric prediction block shapes are introduced.

Among various partitioning modes, a partitioning mode to minimize rate-distortion cost (RDCos) considering the prediction error and an occurrence bit rate is generally selected. In addition, the selected partitioning mode is distinguished as a partitioning mode ('part_mode') as shown in Table 1 below and 'part_mode' is signaled to a decoder.

TABLE 1

| part_mode | Name of part_mode |
|---|---|
| 0 | PART_2N × 2N |
| 1 | PART_2N × N |
| 2 | PART_N × 2N |
| 3 | PART_N × N |
| 4 | PART_2N × nU |
| 5 | PART_2N × nD |
| 6 | PART_nL × 2N |
| 7 | PART_nR × 2N |

FIG. 10 is a diagram illustrating a bi-directional inter prediction to which a single partitioning mode is applied.

In HEVC, the partitioning mode exists in units of a coding block and in the case of the bi-directional inter prediction, an average value is taken by searching reference blocks P0 and P1 having the same shape as a current block P to generate a final reference block (Predictor P=average (P0, P1)) (i.e., a prediction block). That is, the decoder receives the partitioning mode from an encoder in units of the coding block and generates prediction blocks partitioned according to the received partitioning mode.

In this case, when the bi-directional inter prediction is applied to the prediction block, the decoder derives a motion vector for each reference picture. As described above, the motion vector may be derived in a merge mode or an AMVP mode. In addition, the decoder may generate the prediction block by averaging respective reference blocks having the same shape as the prediction block identified by using the motion vector within respective reference pictures.

However, since only reference blocks having the same shape are targeted in both directions, the prediction error may be large in a partial area of the block and in particular, when motion patterns and complexities of list 0 (list 0) reference picture and list 1 (list 1) reference picture are different from each other, the prediction error becomes large.

In addition, when sizes and directions of the motion vectors of the reference pictures are different from each other or the complexities are different from each other, the size of the prediction block may be reduced, for example, an N×N partitioning mode is applied, etc. Therefore, there is a tendency that an additional information amount including block splitting and motion information increases to degrade the compression performance.

In order to solve such a problem, the present invention proposes a method for increasing prediction performance by reducing the prediction error and additional information by combining various prediction block shapes by applying a different partitioning mode for each reference picture.

Hereinafter, in the description of the present invention, generating the prediction block in units of the prediction unit may mean deriving an array of a prediction sample configuring the prediction unit.

Embodiment 1

A description will be given of a possible prediction structure when the method proposed by the present invention is applied with reference to the following drawings. Since the partitioning modes of two reference pictures are different from each other, various combinations of reference blocks may be selected.

FIG. 11 is a diagram illustrating a method for generating a prediction block by applying a different partitioning mode for each reference picture according to an embodiment of the present invention.

In FIG. 11, illustrated is a case where when it is assumed that the size of the current block (for example, a coding unit) is 2N×2N, a partitioning mode (i.e., L0 partitioning mode or first partitioning mode) of a reference picture (reference picture L0) 1110 (or first reference picture) of reference picture list 0 is 2N×N and a partitioning mode (i.e., L1 partitioning mode or second partitioning mode) is N×2N.

Hereinafter, in this specification, a prediction unit in which the inter prediction is performed will be referred to as L0 prediction unit (or first prediction unit) (in the case of FIG. 11, two 2N×N size prediction units) by referring to the L0 reference picture 1110 and an inter-predicted block will be referred to as an L0 prediction block (or first prediction block, in the case of FIG. 11, P_A and P_B) by referring to the L0 reference picture 1110. Similarly, the prediction unit in which the inter prediction is performed will be referred to as L1 prediction unit (or second prediction unit) (in the case of FIG. 11, two N×2N size prediction units) by referring to the L1 reference picture L1 1120 and the inter-predicted block will be referred to as an L1 prediction block (or second prediction block, in the case of FIG. 11, P_C and P_D) by referring to the L1 reference picture 1120.

Further, in this specification, the L0 prediction unit (or first prediction unit) included in one coding unit will be referred to as a first L0 prediction unit, a second L0 prediction unit, etc. in a vertical direction, a horizontal direction, or a z-order scan direction. Similarly, the L1 prediction unit (or second prediction unit) included in one coding unit will be referred to as the first L0 prediction unit, the second L0 prediction unit, etc. in the vertical direction, the horizontal direction, or the z-order scan direction.

The prediction unit of the current block may be determined by combining the partitioning mode for each reference picture. That is, as illustrated in FIG. 11, when the partitioning mode of the L0 reference picture 1110 is 2N×N and the partitioning mode of the L1 reference picture 1120 is N×2N, the prediction unit of the current block may be determined as an N×N size.

In this specification, for convenience of description, the prediction unit of the current block is referred to as a 'sub prediction unit' in order to distinguish the prediction unit of the current block into an L0 prediction unit and an L1 prediction unit.

The decoder may generate the prediction block of the sub prediction unit by using the prediction block of the L0 prediction unit and the prediction block of the L1 prediction unit and generate the prediction block of the current block by merging the prediction blocks. In addition, the decoder sums and then merges the prediction block and a residual block for each sub prediction unit or sums the prediction block of the current block and the residual block to generate a reconstructed block for the current block.

More specifically, the decoder may derive motion information of the L0 prediction unit (first prediction unit) and derive motion information of the L1 prediction unit (second prediction unit).

Here, the motion information may include reference picture information (for example, reference picture index) indicating the reference picture, motion vector predictor information (for example, a motion vector predictor flag) indicating a motion vector predictor within a motion vector predictor candidate list, and/or motion vector difference value information.

The decoder generates the prediction block (i.e., P_A and P_B) of the L0 prediction unit and the prediction block (P_C and P_D) of the L1 prediction unit by using the derived motion information. That is, the prediction block P_A of a first L0 prediction unit is generated from the reference block (or reference sample) in the L0 reference picture using the motion information of the prediction unit, the prediction block P_B of a second L0 prediction unit is generated from the reference block (or reference sample) within the L0 reference picture using the motion information of the prediction unit, the prediction block P_C of a first L1 prediction unit is generated from the reference block (or reference sample) in the L1 reference picture by using the motion information of the prediction unit, and the prediction block P_D of a second L1 prediction unit is generated from the reference block (or reference sample) in the L1 reference picture using the motion information of the prediction unit.

In addition, the prediction blocks (i.e., P0, P1, P2, and P3) of the sub prediction units of the current block may be generated from the average values of the prediction blocks (i.e., P_A and P_B) of the L0 prediction unit and the prediction blocks (P_C and P_D) of the L1 prediction unit.

In other words, the prediction blocks (i.e., P0, P1, P2, and P3) for each sub prediction unit of the current block may be generated from the average values of the areas corresponding to the corresponding sub prediction units within the prediction blocks (i.e., P_A and P_B) of the L0 prediction unit and the prediction blocks (P_C and P_D) of the L1 prediction unit. In this case, for convenience of description, the areas are described, but a prediction sample (pixel) of the sub prediction unit may be generated from an average value (or a weighted sum) of samples (pixels) in the L0 and L1 prediction blocks.

A prediction block P0 of an upper left sub prediction unit of the current block may be generated from the average value of the prediction block P_A (i.e., an area corresponding to P0 in P_A) and the prediction block P_C (i.e., an area corresponding to P0 in P_C).

A prediction block P1 of an upper right sub prediction unit of the current block may be generated from the average value of the prediction block P_A (i.e., an area corresponding to P1 in P_A) and the prediction block P_D (i.e., an area corresponding to P1 in P_D).

A prediction block P2 of a lower left sub prediction unit of the current block may be generated from the average value of the prediction block P_B (i.e., an area corresponding to P2 in P_B) and the prediction block P_C (i.e., an area corresponding to P2 in P_C).

A prediction block P3 of a lower right sub prediction unit of the current block may be generated from the average value of the prediction block P_B (i.e., an area corresponding to P3 in P_B) and the prediction block P_D (i.e., an area corresponding to P3 in P_D).

In addition, the decoder may generate the prediction block for the current block by merging the prediction blocks of the respective generated sub prediction units.

That is, the prediction block P for the current block may be generated by merging the prediction block P0 of the upper left sub prediction unit of the current block, the prediction block P1 of the upper right sub prediction unit of the current block, the prediction block P2 of the lower left sub prediction unit of the current block, and the prediction block P3 of the lower right sub prediction unit of the current block.

Meanwhile, the L0 prediction unit includes a plurality of prediction units (in the case of FIG. 11, two 2N×N size prediction units) and further, the L1 prediction unit includes a plurality of prediction units (in the case of FIG. 11, two N×2N size prediction units).

In this case, as illustrated in FIG. 11, the same reference picture may be used for each L0 prediction unit (the first L0 prediction unit and the second L0 prediction unit) and similarly, the same reference picture may be used for each L1 prediction unit (the first L1 prediction unit and the second L1 prediction unit). That is, each L0 prediction unit may be subjected to the inter prediction by referring to the same reference picture and each L1 prediction unit may be subjected to the inter prediction by referring to the same reference picture.

Alternatively, different reference pictures may be used for each L0 prediction unit (the first L0 prediction unit and the second L0 prediction unit) and different reference pictures may be used for each L1 prediction unit (the first L1 prediction unit and the second L1 prediction unit). That is, each L0 prediction unit may be subjected to the inter prediction by referring to different reference pictures within the L0 reference picture list and each L1 prediction unit may be subjected to the inter prediction by referring to different reference pictures within the L1 reference picture list.

Meanwhile, the prediction blocks (i.e., P0, P1, P2, and P3) of the sub prediction units of the current block may be generated from the weighted sum of the prediction blocks (i.e., P_A and P_B) of the L0 prediction unit and the prediction blocks (P_C and P_D) of the L1 prediction unit.

For example, a first weight w_1 may be applied to the reference picture L0 1110 (that is, the prediction block of the L0 prediction unit) and a second weight w_2 may be applied to the reference picture L1 1120 (that is, the prediction block of the L1 prediction unit) (where w_1+w_2=1).

In this case, the prediction block P0 of the upper left sub prediction unit of the current block may be generated from the sum of P_A*w_1 and P_C*w_2.

The prediction block P1 of the upper right sub prediction unit of the current block may be generated from the sum of P_A*w_1 and P_C*w_2.

The prediction block P2 of the lower left sub prediction unit of the current block may be generated from the sum of P_B*w_1 and P_C*w_2.

The prediction block P3 of the lower right sub prediction unit of the current block may be generated from the sum of P_B*w_1 and P_D*w_2.

In addition, the decoder may generate the prediction block for the current block by merging the prediction blocks of the respective generated sub prediction units.

In this case, the weight applied to each L0/L1 reference picture (or each L0/L1 prediction block) may be determined by the encoder and signaled to the decoder and in this case, the decoder may generate the prediction block of each sub prediction unit by applying the weight received from the encoder.

Alternatively, the decoder may generate the prediction block of each sub prediction unit by applying a predetermined weight.

The embodiment of FIG. 11 above is similar to an effect that the prediction unit of the current block is partitioned into N×N in that the prediction block is generated based on two reference blocks for each sub prediction, but the additional information amount may be reduced by adding one partitioning mode instead of partitioning information.

FIG. 12 is a diagram illustrating a method for generating a prediction block by applying a different partitioning mode for each reference picture according to an embodiment of the present invention.

In FIG. 12, illustrated is a case where when it is assumed that the size of the current block (for example, coding block) is 2N×2N, the partitioning mode of the reference picture (reference picture L0) 1210 of reference picture list 0 is N×2N and the partitioning mode of the reference picture (reference picture L1) 1220 of reference picture list 1 is nL×2N.

The sub prediction unit of the current block may be determined by combining the partitioning mode for each reference picture. That is, as illustrated in FIG. 12, when the partitioning mode of the L0 reference picture 1210 is N×2N and the partitioning mode of the L1 reference picture 1220 is nL×2N, a left prediction unit of the current block may be determined as an nL×2N size, an intermediate prediction unit may be determined as an (N−nL)×2N size, and a right prediction unit may be determined as an N×2N size.

As described above, the decoder may generate the prediction block of the sub prediction unit by using the prediction block of the L0 prediction unit and the prediction block of the L1 prediction unit and generate the prediction block of the current block by merging the prediction blocks. In addition, the decoder sums and then merges the prediction block and the residual block for each sub prediction unit or sums the prediction block of the current block and the residual block to generate the reconstructed block for the current block.

More specifically, the decoder may derive motion information of the L0 prediction unit (first prediction unit) and derive motion information of the L1 prediction unit (second prediction unit).

The decoder generates the prediction block (i.e., P_A and P_B) of the L0 prediction unit and the prediction block (P_C and P_D) of the L1 prediction unit by using the derived motion information. That is, the prediction block P_A of a first L0 prediction unit is generated from the reference block (or reference sample) in the L0 reference picture using the motion information of the prediction unit, the prediction block P_B of a second L0 prediction unit is generated from the reference block (or reference sample) within the L0 reference picture using the motion information of the prediction unit, the prediction block P_C of a first L1 prediction unit is generated from the reference block (or reference sample) in the L1 reference picture by using the motion information of the prediction unit, and the prediction block P_D of a second L1 prediction unit is generated from the reference block (or reference sample) in the L1 reference picture using the motion information of the prediction unit.

In addition, the prediction blocks (i.e., P0, P1, and P2) of the sub prediction units of the current block may be generated from the average values (or weighted sums) of the prediction blocks (i.e., P_A and P_B) of the L0 prediction unit and the prediction blocks (P_C and P_D) of the L1 prediction unit.

In other words, the prediction blocks (i.e., P0, P1, P2, and P3) for each sub prediction unit of the current block may be generated from the average values of the areas corresponding to the corresponding sub prediction units within the prediction blocks (i.e., P_A and P_B) of the L0 prediction unit and the prediction blocks (P_C and P_D) of the L1 prediction unit.

A prediction block P0 of a left sub prediction unit of the current block may be generated from the average value of the prediction block P_A (i.e., an area corresponding to P0 in P_A) and the prediction block P_C (i.e., an area corresponding to P0 in P_C).

A prediction block P1 of an intermediate sub prediction unit of the current block may be generated from the average value of the prediction block P_A (i.e., an area corresponding to P1 in P_A) and the prediction block P_D (i.e., an area corresponding to P1 in P_D).

A prediction block P2 of a right sub prediction unit of the current block may be generated from the average value of the prediction block P_B (i.e., an area corresponding to P2 in P_B) and the prediction block P_D (i.e., an area corresponding to P2 in P_D).

In addition, the decoder may generate the prediction block for the current block by merging the prediction blocks of the respective generated sub prediction units.

That is, the prediction block P for the current block may be generated by merging the prediction block P0 of the left sub prediction unit of the current block, the prediction block P1 of the intermediate sub prediction unit of the current block, and the prediction block P2 of the right sub prediction unit of the current block.

Meanwhile, as described above, the L0 prediction unit includes a plurality of prediction units (in the case of FIG. 12, two N×2N size prediction units) and further, the L1 prediction unit includes a plurality of prediction units (in the case of FIG. 12, nL×2N size and (2N−nL)×2N size prediction units).

In this case, as illustrated in FIG. 12, the same reference picture may be used for each L0 prediction unit (the first L0 prediction unit and the second L0 prediction unit) and similarly, the same reference picture may be used for each L1 prediction unit (the first L1 prediction unit and the second L1 prediction unit).

Alternatively, different reference pictures may be used within the L1 reference picture list for each L0 prediction unit (the first L0 prediction unit and the second L0 prediction unit) and different reference pictures may be used within the L1 reference picture list for each L1 prediction unit (the first L1 prediction unit and the second L1 prediction unit).

Meanwhile, the prediction blocks (i.e., P0, P1, and P2) of the sub prediction units of the current block may be generated from the weighted sum of the prediction blocks (i.e., P_A and P_B) of the L0 prediction unit and the prediction blocks (P_C and P_D) of the L1 prediction unit.

For example, a first weight w_1 may be applied to the reference picture L0 1210 (that is, the prediction block of the L0 prediction unit) and a second weight w_2 may be applied to the reference picture L1 1220 (that is, the prediction block of the L1 prediction unit) (where w_1+w_2=1).

In this case, the prediction block P0 of the left sub prediction unit of the current block may be generated from the sum of P_A*w_1 and P_C*w_2.

The prediction block P1 of the intermediate sub prediction unit of the current block may be generated from the sum of P_A*w_1 and P_C*w_2.

The prediction block P2 of the right sub prediction unit of the current block may be generated from the sum of P_B*w_1 and P_C*w_2.

In addition, the decoder may generate the prediction block for the current block by merging the prediction blocks of the respective generated sub prediction units.

In this case, the weight applied to each L0/L1 reference picture (or each L0/L1 prediction block) may be determined by the encoder and signaled to the decoder and in this case, the decoder may generate the prediction block of each sub prediction unit by applying the weight received from the encoder. Alternatively, the decoder may generate the prediction block of each sub prediction unit by applying a predetermined weight.

According to the embodiment of FIG. 12 above, there is an effect in that the prediction error may be reduced by supporting the intermediate sub prediction unit P1 which may not be supported only by the existing partitioning mode.

Meanwhile, in FIG. 11 above, a case where the L0 partitioning mode is 2N×N, the L1 partitioning mode is N×2 N is illustrated and in FIG. 12, a case where the L0 partitioning mode is N×2N and the L1 partitioning mode is nL×2N is illustrated, but the present invention is not limited thereto.

That is, even when the L0 partitioning mode is any one of the partitioning modes shown in Table 1 above and the L1 partitioning mode is any one of other partitioning modes other than the L0 partitioning mode among the partitioning modes shown in Table 1 above, the prediction block may be generated for each sub prediction unit of the current block in the same scheme as above. In addition, the prediction block for the current block may be generated by merging the prediction blocks of the respective generated sub prediction units.

Further, in FIGS. 11 and 12 above, the partitioning mode for the prediction unit in which the inter prediction is performed using the L0 reference picture and the partitioning mode for the prediction unit in which the inter prediction is performed using the L1 reference picture are illustrated and described, but the present invention is not limited thereto.

As the embodiment according to the present invention, in the case of the bi-directional prediction, a syntax (or syntax element) may be defied as in Table 2 below in order to support different partitioning modes for each reference picture.

TABLE 2

| Syntax | Definition |
|---|---|
| part_mode | part_mode indicates a partitioning mode of a current coding unit. When part_mode_2nd exists, part_mode indicates the partitioning mode of the reference picture of reference picture list 0 (L0) for the coding unit. |
| inter_pred_idc | inter_pred_idc indicates whether the current prediction unit is a list 0 (list 0) uni-directional prediction, a list 1 (list 1) uni-directional prediction, or a bi-directional prediction. inter_pred_idc additionally indicates whether the current coding unit is a bi-directional prediction and has a different partitioning mode for each reference picture. |
| part_mode_2nd | part_mode_2nd indicates the partitioning mode of the reference picture of reference picture list 1 (L1) for the current coding unit. |

Referring to Table 2, 'part_mode' may indicate the partitioning mode of the current coding unit. That is, 'part_mode' may indicate a mode in which the current coding unit is partitioned into a plurality of prediction units.

'part_mode_2nd' may be signaled from the encoder to the decoder only when different partitioning modes are applied to the current coding unit for each reference picture.

Thus, when 'part_mode_2nd' is signaled, a meaning indicated by 'part_mode' may be redefined.

When the meaning indicated by 'part_mode' is redefined as described above, 'part_mode' indicates a partitioning mode (that is, first partitioning information) of the L0 reference picture for the current coding unit. That is, the current coding unit may be partitioned into a plurality of prediction units (i.e., L0 prediction unit or first prediction unit) according to the partitioning mode indicated by 'part_mode'. In addition, the prediction is performed by referring to the L0 reference picture to generate the prediction blocks (i.e., L0 prediction unit or first prediction unit) of the respective prediction units.

Simultaneously, 'part_mode_2nd' indicates a partitioning mode (that is, second partitioning information) of the L1 reference picture for the current coding unit. That is, the current coding unit may be partitioned into a plurality of prediction units (i.e., L1 prediction unit or second prediction unit) according to the partitioning mode indicated by 'part_mode_2nd'. In addition, the prediction is performed by referring to the L0 reference picture to generate the prediction blocks (i.e., L1 prediction block or second prediction block) of the respective prediction units.

'inter_pred_idc' may indicate a case where the bi-directional prediction is applied to the current coding unit (or prediction unit) and 'part_mode' and 'part_mode_2nd' are different from each other.

For example, '0' of 'inter_pred_idc' may denote a uni-directional prediction PRED_L0 of a reference picture list 0 (list0), '1' may denote a uni-directional prediction PRED_L1 of a reference picture list 1 (list1), and '2' may denote a bi-directional prediction PRED_BI. Therefore, in addition, '3' may denote a mode PRED_BI_MIXED which is a bi-directional prediction and has a different partitioning mode for each reference picture.

As a method for reducing the information amount of an added second partitioning mode (e.g., part_mode_2nd) to support another partitioning mode for each reference picture, a most probable mode (MPM) candidate list for the second partitioning mode may be configured as shown in Table 3 below based on a first partitioning mode (e.g., part_mode).

Since a case where part_mode and part_mode_2nd are the same as each other does not occur, the number of candidates of part_mode_2nd is reduced to 7 except for the same mode as part_mode.

The encoder may signal to the decoder a value corresponding to the second partitioning mode in the MPM candidate list configured based on the first partitioning mode.

Table 3 shows a configuration of an MPM list for part_mode_2nd in a case where part_mode_2nd exits only when part_mode and part_mode_2nd according to an embodiment of the present invention are different modes.

TABLE 3

| part_mode | 2N × 2N | 2N × N | N × 2N | N × N |
|---|---|---|---|---|
| part_mode_2nd | 0: 2N × N | 0: 2N × 2N | 0: 2N × 2N | 0: 2N × N |
| | 1: N × 2N | 1: 2N × nU | 1: nL × 2N | 1: N × 2N |
| | 2: N × N | 2: 2N × nD | 2: nR × 2N | 2: 2N × 2N |
| | 3: 2N × nU | 3: N × N | 3: N × N | 3: 2N × nU |
| | 4: 2N × nD | 4: N × 2N | 4: 2N × N | 4: 2N × nD |
| | 5: nL × 2N | 5: nL × 2N | 5: 2N × nU | 5: nL × 2N |
| | 6: nR × 2N | 6: nR × 2N | 6: 2N × nD | 6: nR × 2N |

Referring to Table 3, the mode list and/or order of part_mode_2nd may be changed according to part_mode.

Since the probability of similarity between the first partitioning mode part_mode and the second partitioning mode part_mode_2nd is high, a smaller number of bits may be allocated to a partitioning mode (e.g., a partitioning mode having the same partitioning width or partitioning height as the first partitioning mode) similar to the first partitioning mode part_mode and conversely, a large number of bits may be allocated. That is, a small value may be preferentially allocated to the partitioning mode similar to the first partitioning mode part_mode. Then, the remaining values may be allocated to the remaining partitioning modes.

The mode of the second partitioning mode part_mode_2nd may be variously applied according to the first partitioning mode part_mode, and the similar method may be applied even when the first partitioning mode part_mode is an asymmetric mode.

Table 3 above shows only one example of the MPM list for the second partitioning mode, and the number of modes of the second partitioning mode part_mode_2nd constituting the MPM candidate list may be different from the number of MPM lists. Further, an order of an index indicating the second partitioning mode part_mode_2nd.

FIG. 13 is a diagram illustrating a method for parsing a syntax element of a coding unit from a bitstream according to an embodiment of the present invention.

Referring to FIG. 13, the decoder parses skip indication information (for example, a coding unit skip flag 'cu_skip_flag') of a coding unit to be decoded at present (S1301).

In step S1301, as the 'cu_skip_flag' parsing result, when the 'cu_skip_flag' value is 1, the decoder parses a merge candidate index 'merge_idx' (S1302).

'cu_skip_flag' may indicate whether to parsing the syntax element for the current coding unit. That is, 'cu_skip_flag' may indicate whether a skip mode is applied to the current coding unit.

When 'cu_skip_flag' is 1, the decoder does not parse the syntax element any longer except for the merge candidate index 'merge_idx'.

'merge_idx' indicates the merging candidate index of the merging candidate list. That is, as in the example of FIG. 7 above, the encoder configures the merging candidate list for the current coding unit and signals to the decoder the merging candidate index 'merge_idx' for specifying the candidate block information selected by performing the motion estimation. The decoder may configure the merge candidate list in the same scheme as the encoder and identify the candidate block specified by the merge candidate index. In addition, the reference picture index and the motion vector of the current prediction unit may be derived from the motion information of the identified candidate block. In addition, the prediction block of the current prediction unit may be generated by using the derived reference picture index and motion vector. In this case, since the skip mode is applied, the residual block for the current coding unit may not be signaled from the encoder and the prediction block may correspond to the reconstructed block.

On the contrary, when a value of 'cu_skip_flag' is 0 as a result of parsing 'cu_skip_flag' in step S1301, the decoder parses a prediction mode flag 'pred_mode_flag' for the current coding unit (S1303).

'pred_mode_flag' indicates whether the current coding unit is encoded in the inter prediction mode or encoded in the intra prediction mode.

When 'pred_mode_flag' indicates the inter prediction (INTER) as a result of parsing 'pred_mode_flag' in step S1303, the decoder parses the partitioning mode 'part_mode' (S1304).

In FIG. 13, the intra prediction process is omitted for convenience of description and the case where the current coding unit is encoded in the inter prediction mode, but the present invention is not limited thereto and the case where the current coding unit is encoded in the intra prediction mode may also be applied, of course. That is, when 'pred_mode_flag' indicates the intra prediction (INTRA) as a result of parsing 'pred_mode_flag' in step S1303, the current coding unit may be decoded based on the intra prediction mode.

'part_mode' indicates the partitioning mode for the current coding unit. For example, 'part_mode' may be defined similarly to Table 1 above, defined as a part of Table 1, or defined to be include other partitioning modes together with Table 1.

In step S1304, the current coding unit is partitioned into a plurality of prediction units according to the partitioning mode specified by 'part_mode' and subsequent processes are performed for each partitioned prediction unit. For example, the subsequent processes may be performed for each prediction unit according to a direction from left to right or from top to bottom.

First, the decoder parses a merge flag 'merge_flag' for the current prediction block (S1305).

'merge_flag' specifies whether an inter prediction parameter for the current prediction unit is induced from a neighbor inter-predicted part (or block). In other words, 'merge_flag' specifies whether the aforementioned merge mode is applied for predicting the current prediction unit.

When the merge mode is applied as the result of 'merge_flag' in step S1305, the decoder parses a merge index ('merge_index') (S1306).

'merge_idx' indicates the merging candidate index of the merging candidate list. That is, as in the example of FIG. 7 above, the encoder configures the merging candidate list for the current prediction unit and signals to the decoder the merge candidate index 'merge_idx' for specifying the candidate block information selected by performing the motion estimation. The decoder may configure the merge candidate list in the same scheme as the encoder and identify the candidate block specified by the merge candidate index. In addition, the reference picture index and the motion vector of the current prediction unit may be derived from the motion information of the identified candidate block. In addition, the prediction block of the current prediction unit may be generated by using the derived reference picture index and motion vector. In this case, unlike the aforementioned skip mode, the residual block for the current prediction unit may be signaled from the encoder and the residual block and the prediction block are summed to generate the reconstructed block.

Thereafter, the decoder determines whether the current prediction unit is a last prediction unit (S1314).

In addition, as a result of determination in step S1314, when the current prediction unit is the last prediction unit, a process of parsing the syntax element of the current coding unit is ended. On the contrary, as the result of the determination in step S1314, when the current prediction unit is not the last prediction unit, the process is branched to the previous step of step S1305 above (partition loop) and step S1305 is first performed.

Meanwhile, when the merge mode is not applied as the result of parsing 'merge_flag' in step S1305, the decoder parses an inter prediction index 'inter_pred_idc' (S1307).

'inter_pred_idc' may indicate whether a list 0 uni-directional prediction PRED_L0, a list 1 uni-directional prediction PRED_L1, a bi-directional prediction PRED_BI or a bi-directional prediction PRED_BI_MIXED having a different partitioning mode for each reference picture is applied to the current prediction unit.

The decoder determines condition 1 (cond1) (S1308).

Here, the condition 1 (cond1) may include whether the current prediction unit (or prediction unit) is a bi-directional prediction mode having different partitioning modes (for example, if (inter_pred_idc PRED_BI_MIXED)).

As a result of determination in step S1308, when the current prediction unit (or prediction unit) adopts the bi-directional prediction mode PRED_BI_MIXED having different partitioning modes, the decoder parses the second partitioning mode part_mode_2nd (S1309).

'part_mode_2nd' indicates the partitioning mode of the L1 reference picture for the current coding unit.

For example, 'part_mode_2nd' may be defined similarly to Table 1 above, defined as a part of Table 1, or defined to be include other partitioning modes together with Table 1. Further, 'part_mode_2nd' may be defined as described in Embodiments 1 to 7.

As such, when part_mode_2nd exists (i.e., signaled from the encoder), 'part_mode' may indicate the partitioning mode of the L0 reference picture for the current coding unit and part_mode_2nd may indicate the partitioning mode of the L1 reference picture for the current coding unit.

By 'inter_pred_idc', 'part_mode_2nd' exists only when the L0 partitioning mode and the L1 partitioning mode are different from each other, and the decoder parses all bi-directional motion information for the corresponding coding unit. That is, the decoder parses all motion information for the respective prediction units partitioned from the current coding unit.

The decoder parses the motion information for each L0 prediction unit partitioned by 'part_mode' (S1310). That is, the decoder parses an L0 reference picture index 'ref_idx_l0', a motion vector difference mvd, and an L0 motion vector predictor flag 'mvp_l0_flag' for each L0 prediction unit partitioned by 'part_mode'. For example, the decoder may parse the motion information of the second L0 prediction unit by parsing the motion information of the first L0 prediction unit and branching the process to the previous step of S1310.

In this case, in a case where the L0 prediction unit is 2N×2N when the current coding unit is 2N×2N, step S1310 may not be repeatedly performed with respect to the L0 prediction unit (that is, performed once without applying the partition loop).

The decoder parses the motion information for each L1 prediction unit partitioned by 'part_mode_2nd' (S1311). That is, the decoder parses an L1 reference picture index 'ref_idx_l1', a motion vector difference mvd, and an L1 motion vector predictor flag 'mvp_l1_flag' for each L1 prediction unit partitioned by 'part_mode_2nd'. For example, the decoder may parse the motion information of the second L1 prediction unit by parsing the motion information of the first L1 prediction unit and branching the process to the previous step of S1311.

In this case, in the case where the L1 prediction unit is 2N×2N when the current coding unit is 2N×2N, step S1311 may not be repeatedly performed with respect to the L1 prediction unit (that is, performed once without applying the partition loop).

'ref_idx_lx' (x=0, 1) indicates the reference picture index of the reference list (L0 or L1) for the current prediction unit.

'mvp_lx_flag' indicates the motion vector predictor index in the motion vector predictor candidate list of the reference list (L0 or L1) for the current prediction unit. The motion vector corresponding to the motion vector predictor index indicated by 'mvp_lx_flag' may be derived as the motion vector predictor for the current predicted unit.

The motion vector difference mvd indicates a difference of the motion vector for the current prediction unit and the motion vector predictor. That is, the motion vector difference mvd indicates a value acquired by subtracting the motion vector predictor of the current prediction unit derived by 'mvp_lx_flag' from the motion vector of the current prediction unit.

When the AMVP mode is applied as such, the encoder may configure the motion vector predictor candidate list for the current prediction unit as in the example of FIG. 7 above and signal to the decoder a selected motion vector predictor flag 'mvp_lX_flag' selected by performing the motion estimation, a difference mvd between the motion vector of the current prediction unit and the motion vector predictor indicated by the motion vector predictor flag, and the reference picture index. The decoder may configure the motion vector predictor candidate list in the same scheme as the encoder and derive the motion vector predictor indicated by the motion vector predictor flag. In addition, the derived motion vector predictor and the received motion vector difference mvd are added to derive the motion vector of the current prediction unit. In addition, the prediction block of the current prediction unit may be generated by using the reference picture index and the motion vector.

In FIG. 13, an example in which the motion information for the L0 prediction unit is parsed and the motion information for the L1 prediction unit is parsed is illustrated, but a parsing order of the motion information for the L0 prediction unit and the L1 prediction unit may be transformed to various combinations described below. In the following example, it is assumed that both the L0 prediction unit and the L1 prediction unit are two prediction units, respectively, but the present invention is not limited thereto.

The motion information may be parsed in the order of L0 first prediction unit→L0 second prediction unit→L1 first prediction unit→L1 second prediction unit.

Alternatively, the motion information may be parsed in the order of L0 first prediction unit→L1 first prediction unit→L0 second prediction unit→L1 second prediction unit.

Alternatively, the motion information may be parsed in the order of L1 first prediction unit→L1 second prediction unit→L0 first prediction unit→L0 second prediction unit.

Alternatively, the motion information may be parsed in the order of L1 first prediction unit→L0 first prediction unit→L1 second prediction unit→L0 second prediction unit.

When the motion information of both the L0 prediction unit partitioned by 'part_mode' and the L1 prediction unit partitioned by 'part_mode_2nd' is all parsed, the parsing process of the syntax element of the current coding unit is ended.

On the contrary, as a result of determination in step S1308, when the current coding unit (or prediction unit) does not adopt the bi-directional prediction mode PRED_BI_MIXED having different partitioning modes, the decoder parses the uni-directional or bi-directional motion information of the current prediction unit (S1312 and S1313).

That is, the decoder parses a reference picture index 'ref_idx_lx' (x=0, 1), a motion vector difference mvd, and a motion vector predictor flag 'mvp_lx_flag' (x=0, 1) of the current prediction unit partitioned by 'part_mode' (S1312 and S1313).

In this case, when the uni-directional prediction is applied to the current prediction unit, step S1312 or step S1313 is performed according to the direction (i.e., whether the L0 reference picture is used or the L1 reference picture is used).

On the other hand, when the bi-directional prediction is applied to the current prediction unit, steps S1312 and S1313 are performed.

Thereafter, the decoder determines whether the current prediction unit is a last prediction unit (S1314).

In addition, as a result of determination in step S1314, when the current prediction unit is the last prediction unit, a process of parsing the syntax element of the current coding unit is ended. On the contrary, as the result of the determination in step S1314, when the current prediction unit is not the last prediction unit, the process is branched to the previous step of step S1305 above (partition loop) and step S1305 is first performed.

Embodiment 2

A new mode N_Mode may be added in order to maintain the number of modes of part_mode_2nd and the number of modes of part_mode to be equal to each other.

Table 4 shows a configuration of the MPM list for part_mode_2nd when the new mode for part_mode_2nd according to an embodiment of the present invention is applied.

TABLE 4

| part_mode | 2N × 2N | 2N × N | N × 2N | N × N |
|---|---|---|---|---|
| part_mode_2nd | 0: 2N × N | 0: 2N × 2N | 0: 2N × 2N | 0: 2N × N |
|  | 1: N × 2N | 1: 2N × nU | 1: nL × 2N | 1: N_Mode |
|  | 2: N × N | 2: 2N × nD | 2: nR × 2N | 2: N × 2N |
|  | 3: 2N × nU | 3: N_Mode | 3: N_Mode | 3: 2N × 2N |
|  | 4: 2N × nD | 4: N × N | 4: N × N | 4: 2N × nU |
|  | 5: nL × 2N | 5: N × 2N | 5: 2N × N | 5: 2N × nD |
|  | 6: nR × 2N | 6: nL × 2N | 6: 2N × nU | 6: nL × 2N |
|  | 7: N_Mode | 7: nR × 2N | 7: 2N × nD | 7: nR × 2N |

Referring to Table 4, it can be seen that the mode list and/or order of part_mode_2nd are/is changed according to part_mode.

The mode of part_mode_2nd may be variously applied according to part_mode and may be applied by a similar method as above even when part_mode is an asymmetric mode.

The new partitioning mode N_Mode will be described below in more detail.

Further, the number of candidate modes of part_mode_2nd may be limited to a predetermined number.

Table 5 shows a configuration of the MPM list for part_mode_2nd when the number of modes for part_mode_2nd according to an embodiment of the present invention is limited.

TABLE 5

| part_mode | 2N × 2N | 2N × N | ... | nL × 2N |
|---|---|---|---|---|
| part_mode_2nd | 0: 2N × nU | 0: 2N × nU |  | 0: 2N × 2N |
|  | 1: 2N × nD | 1: 2N × nD |  | 1: N × 2N |
|  | 2: nL × 2N | 2: nL × 2N |  | 2: 2N × N |
|  | 3: nR × 2N | 3: nR × 2N |  | 3: N × N |

Referring to Table 5, there is an example in which the number of candidate partitioning modes of part_mode_2nd is limited (e.g., limited to a partitioning mode having a high occurrence frequency).

As described above, when the number of candidate modes of part_mode_2nd is limited, in a case where both part_mode and part_mode_2nd are one of 2N×2N, 2N×N, N×2N, and N×N, the same effect as being determined as a mode (i.e., a mode which is partitioned into smaller size of blocks of part_mode and part_mode_2nd) of a smaller size is shown as compared with the bi-directional prediction, and as a result, the mode in one direction may be restricted to asymmetric partitioning. In this case, since a binarization method of part_mode_2nd may be classified according to part_mode, it is possible to allocate a smaller number of bits in comparison with the existing binarization method.

Further, when the number of modes of part_mode_2nd is limited, the new mode N_Mode may be applied.

Table 6 shows the configuration the MPM list in the case of applying the new mode when the number of modes according to an embodiment of the present invention is limited to the mode having the high occurrence frequency.

TABLE 6

| part_mode | 2Nx2N | 2N × N | N × 2N | N × N |
|---|---|---|---|---|
| part_mode_2nd | 0: 2N × N | 0: 2N × 2N | 0: 2N × 2N | 0: 2N × N |
|  | 1: N × 2N | 1: 2N × nU | 1: nL × 2N | 1: N × 2N |
|  | 2: N × N | 2: 2N × nD | 2: nR × 2N | 2: 2N × 2N |
|  | 3: N_Mode | 3: N_Mode | 3: N_Mode | 3: N_Mode |

Tables 4 to 6 above show only one example of the MPM list for the second partitioning mode, and the number of modes of the second partitioning mode part_mode_2nd constituting the MPM candidate list may be defined to be different from the number of MPM lists. Further, an order of an index indicating the second partitioning mode part_mode_2nd.

In summary of the embodiment of the present invention described above, the candidate partitioning mode (i.e., MPM list) for part_mode_2nd may be determined using the following method.

- The mode type and/or the mode order of part_mode_2nd may be determined according to part_mode of the current block.
- The mode type and/or the mode order of part_mode_2nd may be determined according to part_mode of a neighbor block.
- The mode type and/or the mode order of part_mode_2nd may be determined according to part_mode_2nd of the neighbor block.
- The number of candidate modes of part_mode_2nd may be limited in order to reduce a data amount of part_mode_2nd.

Any one of the methods described above may be used or one or more methods may be combined and used.

As one example using the method described above, the MPM list for part_mode_2nd of the current block may be configured as follows according to part_mode of the current block and part_mode and part_mode_2nd of the neighbor block.

Table 7 shows the configuration of the MPM list for part_mode_2nd according to an embodiment of the present invention.

TABLE 7

| part_mode | Condition(s) | | MPM0 | MPM1 | MPM2 |
|---|---|---|---|---|---|
| 2N × 2N, N × N | part_mode == L | part_mode == A | 2N × N | N × 2N | 2N × nU |
| | | part_mode != A | A | 2N × N | N × 2N |
| | part_mode != L | — | L | 2N × N | N × 2N |
| 2N × N | part_mode == L | part_mode == A | 2N × 2N | 2N × nU | 2N × nD |
| | | part_mode != A | A | 2N × 2N | 2N × nU |
| | part_mode != L | — | L | 2N × 2N | 2N × nU |
| 2N × nU | part_mode == L | part_mode == A | 2N × 2N | 2N × N | 2N × nD |
| | | part_mode != A | A | 2N × 2N | 2N × N |
| | part_mode != L | — | L | 2N × 2N | 2N × N |
| 2N × nD | part_mode == L | part_mode == A | 2N × 2N | 2N × N | 2N × nU |
| | | part_mode != A | A | 2N × 2N | 2N × N |
| | part_mode != L | — | L | 2N × 2N | 2N × N |
| N × 2N | part_mode == L | part_mode == A | 2N × 2N | nL × 2N | nR × 2N |
| | | part_mode != A | A | 2N × 2N | nL × 2N |
| | part_mode != L | — | L | 2N × 2N | nL × 2N |
| nL × 2N | part_mode == L | part_mode == A | 2N × 2N | N × 2N | nR × 2N |
| | | part_mode != A | A | 2N × 2N | N × 2N |
| | part_mode != L | — | L | 2N × 2N | N × 2N |
| nR × 2N | part_mode == L | part_mode == A | 2N × 2N | N × 2N | nR × 2N |
| | | part_mode != A | A | 2N × 2N | N × 2N |
| | part_mode != L | — | L | 2N × 2N | N × 2N |

Table 7 shows the MPM list for part_mode_2nd of the current block configured according to part_mode of the current block and part_mode and part_mode_2nd of the neighbor block.

In this case, in the case of the neighbor block, a left block adjacent to a left side of the current block and an upper block adjacent to an upper side of the current block may become candidate blocks. In Table 7, 'L' represents the partitioning mode of the left block and 'A' represents the partitioning mode of the upper block.

When the bi-directional prediction is applied to the left block (i.e., when inter_pred_idc is the 'PRED_BI_MIXED' mode), part_mode_2nd of the left block may correspond to 'L' and when the bi-directional prediction is not applied to the left block (i.e., when inter_pred_idc is not the 'PRED_BI_MIXED' mode), part_mode of the left block may correspond to 'L'.

Similarly, when the bi-directional prediction is applied to the upper block (i.e., when inter_pred_idc is the 'PRED_BI_MIXED' mode), part_mode_2nd of the upper block may correspond to 'A' and when the bi-directional prediction is not applied to the upper block (i.e., when inter_pred_idc is not the 'PRED_BI_MIXED' mode), part_mode of the left block may correspond to 'A'.

In Table 7, when part_mode of the current block is 2N×2N or N×N, part_mode of the current block is the same as L and when part_mode of the current block is the same as A, MPM0 corresponds to 2N×N, MPM1 corresponds to N×2N, and MPM2 corresponds to 2N×nU. On the contrary, when part_mode of the current block is the same as L and part_mode of the current block is not the same as A, MPM0 corresponds to A, MPM1 corresponds to 2N×N, and MPM2 corresponds to N×2N. On the contrary, when part_mode of the current block is the same as L and part_mode of the current block is not the same as A, MPM0 corresponds to A, MPM1 corresponds to 2N×N, and MPM2 corresponds to N×2N.

Items other than those in Table 7 may also be interpreted in the same manner as above.

In order to apply the method shown in Table 7, a syntax for indicating part_mode_2nd may be defined. For example, pred_mode_mpm_idx may be defined and a partitioning mode corresponding to part_mode_2nd may be indicated in the MPM list configured as shown in the Tables 3 to 7 above. In addition, the syntax may be defined as shown in Table 8 below, and it may be selected whether to indicate the index for the partitioning mode corresponding to part_mode_2nd in the MPM list or to indicate the partitioning mode corresponding to part_mode_2nd among the remaining partitioning modes not included in the MPM list.

Table 8 is a table showing the syntax for indicating part_mode_2nd.

TABLE 8

| | |
|---|---|
| part_mode_mpm_pred_flag | ae(v) |
| if(part_mode_mpm_pred_flag) | |
|     pred_mode_mpm_idx | ae(v) |
| else | |
|     part_mode_rem_mode | ae(v) |

Referring to Table 8, the decoder parses part_mode_mpm_pred_flag. part_mode_mpm_pred_flag may indicate whether part_mode_2nd is indicated in the MPM list. Here, the MPM list for part_mode_2nd may be configured as shown in Tables 3 to 7 described above.

When part_mode_mpm_pred_flag is 1, the decoder parses pred_mode_mpm_idx. pred_mode_mpm_idx indicates an index for indicating the partitioning mode corresponding to part_mode_2nd among the partitioning modes included in the MPM list for part_mode_2nd.

On the other hand, when part_mode_mpm_pred_flag is 0, the decoder parses part_mode rem mode. pred_mode_mpm_idx indicates an index for indicating the partitioning mode corresponding to part_mode_2nd among the partitioning modes included in the MPM list for part_mode_2nd. Indicates an index for indicating part_mode_2nd in.

Meanwhile, names of syntax elements shown in Table 8 are only examples and the present invention is not limited thereto.

Embodiment 3

The new mode (i.e., N_mode) of part_mode_2nd according to part_mode described above will be described below with reference to FIGS. 14 and 15.

FIG. 14 illustrates a new partitioning mode N_mode of a second partitioning mode depending on a first partitioning mode according to an embodiment of the present invention.

FIG. 14 illustrates an example of applying a geometric partitioning mode as the new mode for part_mode_2nd.

FIG. 14(a) illustrates the N_Mode mode of part_mode_2nd in the case where part_mode 2N×2N, FIG. 14(b) illustrates the N_Mode mode of part_mode_2nd in the case where part_mode is 2N×N, FIG. 14(c) illustrates the N_Mode mode of part_mode_2nd in the case where part_mode is N×2N, FIG. 14(d) illustrates the N_Mode mode of part_mode_2nd in the case where part_mode is N×N, FIG. 14(e) illustrates the N_Mode mode of part_mode_2nd in the case where part_mode is 2N×nU, FIG. 14(f) illustrates the N_Mode mode of part_mode_2nd in the case where part_mode is 2N×nD, FIG. 14(g) illustrates the N_Mode mode of part_mode_2nd in the case where part_mode is nL×2N, and FIG. 14(h) illustrates the N_Mode mode of part_mode_2nd in the case where part_mode is nR×2N.

One or more vertexes of a block before being partitioned are referred to as a first vertex. In addition, when a line segment for dividing blocks partitioned according to part_mode is referred to as a dividing line, one or more where the dividing line and the block before being partitioned are referred to as a second vertex. That is, in part_mode_2nd, the block may be partitioned according to a line segment connecting the first vertex and the second vertex determined according to part_mode.

In other words, the height and/or width of the blocks partitioned according to part_mode_2nd may be kept the same as the height and/or width of the blocks partitioned according to part_mode. As an example, in the case where part_mode_2nd is 2N×N as illustrated in FIG. 14(b), the width of the blocks partitioned according to part_mode_2nd may correspond to 2N and a left or right height may correspond to N.

Figure 15:
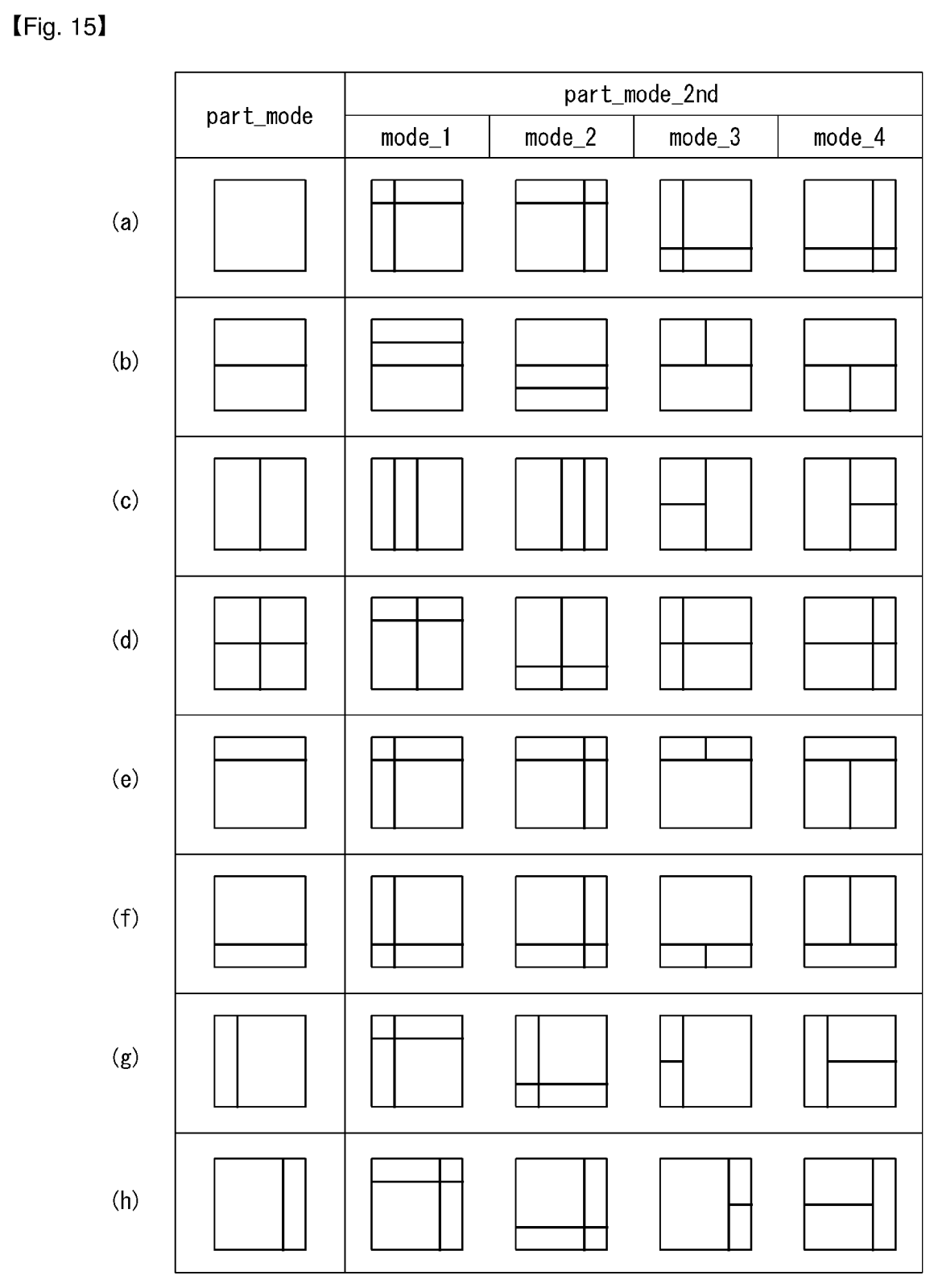

FIG. 15 illustrates a new partitioning mode N_mode of a second partitioning mode depending on a first partitioning mode according to an embodiment of the present invention.

FIG. 15 illustrates an example of applying a rectangular partitioning mode as the new mode for part_mode_2nd.

Hereinafter, in describing the N_Mode mode of part_mode_2nd, each partitioning block will be described according to a z scan order for easy description.

FIG. 15(a) illustrates the N_Mode mode of part_mode_2nd in the case where part_mode is 2N×2N. Mode 1 (mode_1) of part_mode_2nd may be partitioned into 1/2N×1/2N, 3/2N×1/2N, 1/2N×3/2N, and 3/2N×3/2N, mode 2 (mode_2) may be partitioned into 3/2N×1/2N, 1/2N×1/2N, 3/2N×3/2N, and 1/2N×3/2N, mode 3 (mode_3) may be partitioned into 1/2N×3/2N, 3/2N×3/2N, 1/2N×1/2N, and 3/2N×1/2N, and mode 4 (mode_4) may be partitioned into 3/2N×3/2N, 1/2N×3/2N, 3/2N×1/2N, and 1/2N×1/2N.

FIG. 15(b) illustrates the N_Mode mode of part_mode_2nd in the case where part_mode is 2N×N. Mode 1 (mode_1) of part_mode_2nd may be partitioned into 2N×1/2N, 2N×1/2N, and 2N×N, mode 2 (mode_2) of part_mode_2nd may be partitioned into 2N×N, 2N×1/2N, and 2N×1/2N, mode 3 (mode_3) of part_mode_2nd may be partitioned into N×N, N×N, and 2N×N, and mode_4 (mode_4) of part_mode_2nd may be partitioned into 2N×N, N×N, and N×N.

FIG. 15(c) illustrates the N_Mode mode of part_mode_2nd in the case where part_mode is N×2N. Mode 1 (mode_1) of part_mode_2nd may be partitioned into 1/2N×2N, 1/2N×2N, and N×2N, mode 2 (mode_2) of part_mode_2nd may be partitioned into N×2N, 1/2N×2N, and 1/2N×2N, mode 3 (mode_3) of part_mode_2nd may be partitioned into N×N, N×2N, and N×N, mode 3 (mode_3) of part_mode_2nd may be partitioned into N×N, N×2N, and N×N, and mode_4 (mode_4) of part_mode_2nd may be partitioned into N×2N, N×N, and N×N.

FIG. 15(d) illustrates the N_Mode mode of part_mode_2nd in the case where part_mode is N×N. Mode 1 (mode_1) of part_mode_2nd may be partitioned into N×1/2N, N×1/2N, N×3/2N, and N×3/2N, mode 2 (mode_2) of part_mode_2nd may be partitioned into N×3/2N, N×3/2N, N×1/2N, and N×1/2N, mode 3 (mode_3) of part_mode_2nd may be partitioned into 1/2N×N, 3/2N×N, 1/2N×N, and 3/2N×N, and mode_4 (mode_4) of part_mode_2nd may be partitioned into 3/2N×N, 1/2N×N, 3/2N×N, and 1/2N×N.

FIG. 15(e) illustrates the N_Mode mode of part_mode_2nd in the case where part_mode is 2N×nU. Mode 1 (mode_1) of part_mode_2nd may be partitioned into 1/2N×1/2N, 3/2N×1/2N, 1/2N×3/2N, and 3/2N×3/2N, mode 2 (mode_2) may be partitioned into 3/2N×1/2N, 1/2N×1/2N, 3/2N×3/2N, and 1/2N×3/2N, mode 3 (mode_3) may be partitioned into N×1/2N, N×1/2N, and 2N×3/2N, and mode_4 (mode_4) may be partitioned into 2N×1/2N, N×3/2N, and N×3/2N.

FIG. 15(f) illustrates the N_Mode mode of part_mode_2nd in the case where part_mode is 2N×nD. Mode 1 (mode_1) of part_mode_2nd may be partitioned into 1/2N×3/2N, 3/2N×3/2N, 1/2N×1/2N, and 3/2N×1/2N, mode 2 (mode_2) may be partitioned into 3/2N×3/2N, 1/2N×3/2N, 3/2N×1/2N, and 1/2N×1/2N, mode 3 (mode_3) may be partitioned into 2N×3/2N, N×1/2N, and N×1/2N, and mode_4 (mode_4) may be partitioned into N×3/2N, N×3/2N, and 2N×1/2N.

FIG. 15(g) illustrates the N_Mode mode of part_mode_2nd in the case where part_mode is nL×2N. Mode 1 (mode_1) of part_mode_2nd may be partitioned into 1/2N×1/2N, 3/2N×1/2N, 1/2N×3/2N, and 3/2N×3/2N, mode 2 (mode_2) may be partitioned into 1/2N×3/2N, 3/2N×3/2N, 1/2N×1/2N, and 3/2N×1/2N, mode 3 (mode_3) may be partitioned into 1/2N×N, 3/2N×2N, and 1/2N×N, and mode_4 (mode_4) may be partitioned into 1/2N×2N, 3/2N×N, and 3/2N×N.

FIG. 15(h) illustrates the N_Mode mode of part_mode_2nd in the case where part_mode is nR×2N. Mode 1 (mode_1) of part_mode_2nd may be partitioned into 3/2N×1/2N, 1/2N×1/2N, 3/2N×3/2N, and 1/2N×3/2N, mode 2 (mode_2) may be partitioned into 3/2N×3/2N, 1/2N×3/2N, 3/2N×1/2N, and 1/2N×1/2N, and mode 3 (mode_3) may be partitioned into 3/2N×2N, 1/2N×N, and 1/2N×N.

Meanwhile, although the new mode (N_Mode) illustrated in FIGS. 14 and 15 is applied to part_mode_2nd for convenience of description, the present invention is not limited thereto. That is, the new mode (N_Mode) illustrated in FIGS. 14 and 15 may be applied to a case of having a single partitioning mode, that is, part_mode.

In the examples of FIGS. 14 and 15 described above, a plurality of candidates may be defined for N_mode available for part_mode_2nd according to part_mode and one of the plurality of candidates may be selected in consideration of the partitioning mode of the neighbor block among the plurality of candidates. This will be described with reference to the following drawing.

FIG. 16 is a diagram illustrating a method for selecting a new mode N_mode according to an embodiment of the present invention.

FIG. 16(a) illustrates the case where part_mode of the current block is 2N×N as illustrated in FIG. 14(b). Further, a case where part_mode of the left block (Left CU) among the neighbor blocks is 2N×N (CU1) and nR×2N (CU2) and part_mode of the upper block (above CU) is 2N×N is illustrated.

When part_mode of the current block is 2N×N, there are four possible candidates for the N_Mode mode for part_mode_2nd and one of them may be selected in consideration of the partitioning mode of the neighbor block. A second partitioning mode #2 of the four candidates may be selected considering part_mode of the left block (Left CU) and part_mode of the upper block (Above CU) as illustrated in FIG. 16(a).

The N_Mode mode for part_mode_2nd may be determined according to part_mode of the neighbor block.

The N_Mode mode for part_mode_2nd may be determined according to part_mode_2nd of the neighbor block.

The number of candidate modes of the N_Mode mode for part_mode_2nd may be changed. That is, the number of candidate modes may not be fixed.

Any one of the methods described above may be used or one or more methods may be combined and used.

As an example of using the method described above, the MPM list for part_mode_2nd of the current block may be configured as follows according to part_mode of the current block and part_mode and part_mode_2nd of the neighbor block.

Table 9 shows the configuration of the MPM list for part_mode_2nd according to an embodiment of the present invention.

TABLE 9

| part_mode | Condition(s) | MPM0 | MPM1 | MPM2 | MPM3 |
|---|---|---|---|---|---|
| 2N × 2N, N × N | — | mode_1 | mode_2 | mode_3 | mode_4 |
| Horizontal (2N × N, 2N × nU, 2N × nD) | L == HOR | mode_1 | mode_2 | mode_3 | mode_4 |
| | L != HOR and A == VER | mode_3 | mode_4 | mode_1 | mode_2 |
| Vertical (N × 2N, nL × 2N, nR × 2N) | A == VER | mode_1 | mode_2 | mode_3 | mode_4 |
| | A != VER and L == HOR | mode_3 | mode_4 | mode_1 | mode_2 |

FIG. 16(b) illustrates the case where part_mode of the current block is 2N×2N as illustrated in FIG. 15(a). Further, a case where part_mode of the left block (Left CU) among the neighbor blocks is 2N×nU and part_mode of the upper block (above CU) is nL×2N is illustrated.

When part_mode of the current block is 2N×2N, there are four possible candidates for the N_Mode mode for part_mode_2nd and similarly, one of them may be selected in consideration of the partitioning mode of the neighbor block. A first partitioning mode #1 of the four candidates may be selected considering part_mode of the left block (Left CU) and part_mode of the upper block (Above CU) as illustrated in FIG. 16(b).

As illustrated in FIGS. 16(a) and 16(b), among the possible candidates for part_mode_2nd, part_mode_2nd may be selected so that the width of the partitioning block is the same as (or similar to) that of part_mode of the upper block (Above CU) and the height of the partitioning block is the same as (or similar to) part_mode of the left bock (Left CU).

In summary of the embodiment of the present invention described above, the N_Mode for part_mode_2nd may be determined using the following method.

The candidate mode of the N_Mode mode for part_mode_2nd may be determined according to part_mode.

The candidate mode of the N_Mode mode for part_mode_2nd may be determined according to part_mode of the neighbor block.

The candidate mode of the N_Mode mode for part_mode_2nd may be determined according to part_mode_2nd of the neighbor block.

The N_Mode mode for part_mode_2nd may be determined according to part_mode of the current block.

Table 9 shows the MPM list for part_mode_2nd of the current block configured according to part_mode of the current block and part_mode and part_mode_2nd of the neighbor block.

In this case, in the case of the neighbor block, a left block adjacent to a left side of the current block and an upper block adjacent to an upper side of the current block may become candidate blocks. In Table 9, 1' represents the partitioning mode of the left block and 'A' represents the partitioning mode of the upper block.

When the bi-directional prediction is applied to the left block (i.e., when inter_pred_idc is the 'PRED_BI_MIXED' mode), part_mode_2nd of the left block may correspond 'L' and when the bi-directional prediction is not applied to the left block (i.e., when inter_pred_idc is not the 'PRED_BI_MIXED' mode), part_mode of the left block may correspond to 'L'.

Similarly, when the bi-directional prediction is applied to the upper block (i.e., when inter_pred_idc is the 'PRED_BI_MIXED' mode), part_mode_2nd of the upper block may correspond to 'A' and when the bi-directional prediction is not applied to the upper block (i.e., when inter_pred_idc is not the 'PRED_BI_MIXED' mode), part_mode of the left block may correspond to 'A'.

In Table 9, in the case where part_mode is 2 N×N, when L is a horizontal partitioning mode (i.e., 2N×N, 2N×nU, and 2N×nD), MPM0 corresponds to mode_1 (mode_1), MPM1 corresponds to mode 2 (mode_2), MPM2 corresponds to mode_3 (mode_3), and MPM3 corresponds to mode_4 (mode_4), among four N_mode candidates according to the case where part_mode of the current block is 2N×N. On the contrary, when L is not the horizontal partitioning mode (i.e., 2N×N, 2N×nU, and 2N×nD), MPM0 corresponds to mode_3 (mode_3), MPM1 corresponds to mode_4

(mode_4), MPM2 corresponds to mode_1 (mode_1), and MPM3 corresponds to mode_2 (mode_2), among four N_mode candidates according to the case where part_mode of the current block is 2N×N.

Items other than those in Table 9 may also be interpreted in the same manner as above.

Embodiment 4

According to an embodiment of the present invention, part_mode_2nd may be defined to be a sub-partition of part_mode.

FIG. 17 illustrates part_mode_2nd according to an embodiment of the present invention.

FIG. 17 illustrates an example in which part_mode_2nd is used as a mode for sub-partitioning the corresponding prediction unit when part_mode is 2N×N.

Referring to FIG. 17, since the partitioning mode (part_mode) of L0 is 2N×N, the partitioning mode (part_mode) of L0 may be partitioned into two prediction units P0 and P1 and the partitioning mode (part_mode_2nd) of L1 may be applied to each P0 or P1 block and each of the P0 and P1 blocks may be partitioned into two blocks.

In this case, in the case where the partitioning mode of L1 is 2N×2N, the same result as the partitioning mode of L0 is shown, and as a result, the corresponding partitioning mode may be excluded from the candidate mode of part_mode_2nd.

The mode of part_mode_2nd may be variously applied according to part_mode and may be applied by a similar method as above even when part_mode is an asymmetric mode. Further, the new mode N_Mode (referring to FIGS. 14 and 15 above) may be added in order to maintain the number of modes of part_mode_2nd and the number of modes of part_mode to be equal to each other.

Table 10 shows a part_mode_2nd mode list having a meaning of the sub-partitioning.

TABLE 10

| part_mode | 2N × 2N | 2N × N | N × 2N | N × N |
|---|---|---|---|---|
| part_mode_2nd | 0: 2N × N<br>1: N × 2N<br>2: N × N<br>3: 2N × nU<br>4: 2N × nD<br>5: nL × 2N<br>6: nR × 2N | 0: 2N × N<br>1: 2N × nU<br>2: 2N × nD<br>3: N × N<br>4: N × 2N<br>5: nL × 2N<br>6: nR × 2N | 0: N × 2N<br>1: nL × 2N<br>2: nR × 2N<br>3: N × N<br>4: 2N × N<br>5: 2N × nU<br>6: 2N × nD | 0: N × N<br>1: 2N × N<br>2: N × 2N<br>3: 2N × nU<br>4: 2N × nD<br>5: nL × 2N<br>6: nR × 2N |

In Table 10, it can be seen that the mode list and/or order of part_mode_2nd are/is changed according to part_mode.

Table 10 above shows only one example of the MPM list for the second partitioning mode, and the number of modes of the second partitioning mode part_mode_2nd constituting the MPM candidate list may be defined to be different from the number of MPM lists. Further, an order of an index indicating the second partitioning mode part_mode_2nd may be changed.

According to the embodiment, since the partitioning mode is dependent on the partitioning mode of L0, only the partitioning mode of L1 may be continuously sub-partitioned. In order to prevent such a problem, when an indicator for a prediction direction of the current block (e.g., prediction block) has a value (for example, inter_pred_idc is 3) other than the L0 prediction, the L1 prediction, or the bi-directional prediction, part_mode may principally indicate the partitioning mode of L0 and part_mode_2nd may principally indicate the partitioning mode of L1, but this may be changed in consideration of the distance of the reference picture. That is, a distance between the current picture and the L0 reference picture and a distance between the current picture and the L1 reference picture are compared to determine the partitioning modes indicated by part_mode and part_mode_2nd are the L0 partitioning mode or the L1 partitioning mode. For example, when the distance between the L0 reference picture and the current picture is larger than the distance between the current picture and the L1 reference picture, part_mode may indicate the partitioning mode of L1 and part_mode_2nd may indicate the partitioning mode of L0.

Such a method may be applied to all cases in which part_mode_2nd exists.

Embodiment 5

A method is defined, which enables part_mode_2nd to use some (or all) prediction units of the coding unit. Here, a meaning of enabling the use may correspond to a meaning of enabling the bi-directional prediction. That is, part_mode_$2^{nd}$ may indicate a block in which the bi-directional prediction is enabled in the current block.

FIG. 18 illustrates part_mode_2nd according to an embodiment of the present invention.

In FIG. 18, part_mode_2nd meaning that only some areas of the current block (e.g., coding block) is available is illustrated.

FIG. 18 illustrates the mode of part_mode_2nd available when part_mode is 2N×N. That is, the partitioning mode of L0 is divided into two prediction units P0 and P1. Here, the partitioning mode_2N×N_0 of L1 indicates that only P0' is available of two prediction units P0' and P1' of 2N×N.

Consequently, since the motion information is provided only for a shaded area in FIG. 18, there is a structure in which the area has the bi-directional prediction and the remaining area that is not shaded has the uni-directional prediction.

Table 11 shows a part_mode_2nd mode list meaning that only some areas are available.

TABLE 11

| part_mode | 2N × 2N | 2N × N | N × 2N | N × N |
|---|---|---|---|---|
| part_mode_2nd | 0: 2N × N_0 | 0: 2N × 2N | 0: 2N × 2N | 0: N × N_0 |
| | 1: 2N × N_1 | 1: 2N × N_0 | 1: N × 2N_0 | 1: N × N_1 |
| | 2: N × 2N_0 | 2: 2N × N_1 | 2: N × 2N_1 | 2: N × N_2 |
| | 3: N × 2N_1 | 3: 2N × nU_0 | 3: nL × 2N_0 | 3: N × N_3 |
| | 4: 2N × nU_0 | 4: 2N × nU_1 | 4: nL × 2N_1 | 4: 2N × N_0 |
| | 5: 2N × nU_1 | 5: 2N × nD_0 | 5: nR × 2N_0 | 5: 2N × N_1 |
| | 6: 2N × nD_0 | 6: 2N × nD_1 | 6: nR × 2N_1 | 6: N × 2N_0 |
| | 7: 2N × nD_1 | 7: N_Mode | 7: N_Mode | 7: N × 2N_1 |

In Table 11, it can be seen that the mode list and/or order of part_mode_2nd are/is changed according to part_mode.

Table 11 above shows only one example of the mode of part_mode_2nd and the mode of part_mode_2nd may be variously applied according to part_mode, and may be applied in a similar method even when part_mode is the asymmetric mode. Further, the number of modes of part_mode_2nd may be limited or a new mode may be included, and the present invention is also applicable to a case of having a single partitioning mode.

Since the partitioning mode of L1 is determined depending on the partitioning mode of L0 similarly to Embodiment 4 described above, part_mode basically represents the partitioning mode of L0 and part_mode_2nd may basically represent the partitioning mode of L1, but this may be changed by considering the distance of the reference picture.

Embodiment 6

As in Embodiment 5, a method is defined, which enables part_mode_2nd to use only some prediction units of the coding block. In order to prevent indexes for modes 2N×N_0, 2N×N_1, . . . , 2×nD_0, 2N×nD_1 of part_mode_2nd representing that only some areas are available from increasing, whether some prediction units are available for each partitioning mode may be represented by a flag (e.g., mode_available_idx).

FIG. 19 is a diagram illustrating a method for parsing a syntax element of a coding unit from a bitstream according to an embodiment of the present invention.

Referring to FIG. 19, the decoder parses skip indication information (for example, a coding unit skip flag 'cu_skip_flag') of a coding unit to be decoded at present (S1901).

In step S1901, as the 'cu_skip_flag' parsing result, when the 'cu_skip_flag' value is 1, the decoder parses a merge candidate index 'merge_idx' (S1902).

'cu_skip_flag' may indicate whether to parsing the syntax element for the current coding unit. That is, 'cu_skip_flag' may indicate whether a skip mode is applied to the current coding unit.

When 'cu_skip_flag' is 1, the decoder does not parse the syntax element any longer except for the merge candidate index 'merge_idx'.

'merge_idx' indicates the merging candidate index of the merging candidate list. That is, as in the example of FIG. 7 above, the encoder configures the merging candidate list for the current coding unit and signals to the decoder the merging candidate index 'merge_idx' for specifying the candidate block information selected by performing the motion estimation. The decoder may configure the merge candidate list in the same scheme as the encoder and identify the candidate block specified by the merge candidate index. In addition, the reference picture index and the motion vector of the current prediction unit may be derived from the motion information of the identified candidate block. In addition, the prediction block of the current prediction unit may be generated by using the derived reference picture index and motion vector. In this case, since the skip mode is applied, the residual block for the current coding unit may not be signaled from the encoder and the prediction block may correspond to the reconstructed block.

On the contrary, in step S1901, when a value of 'cu_skip_flag' is 0 as a result of parsing 'cu_skip_flag', the decoder parses a prediction mode flag 'pred_mode_flag' for the current coding unit (S1903).

'pred_mode_flag' indicates whether the current coding unit is encoded in the inter prediction mode or encoded in the intra prediction mode.

In step S1903, when 'pred_mode_flag' indicates the inter prediction (INTER) as a result of parsing 'pred_mode_flag', the decoder parses the partitioning mode 'part_mode' (S1904).

In FIG. 19, the intra prediction process is omitted for convenience of description and the case where the current coding unit is encoded in the inter prediction mode, but the present invention is not limited thereto and the case where the current coding unit is encoded in the intra prediction mode may also be applied, of course. That is, when 'pred_mode_flag' indicates the intra prediction (INTRA) as a result of parsing 'pred_mode_flag' in step S1903, the current coding unit may be decoded based on the intra prediction mode.

'part_mode' indicates the partitioning mode for the current coding unit. For example, 'part_mode' may be defined similarly to Table 1 above, defined as a part of Table 1, or defined to be include other partitioning modes together with Table 1.

In step S1304, the current coding unit is partitioned into a plurality of prediction units according to the partitioning mode specified by 'part_mode' and subsequent processes are performed for each partitioned prediction unit. For example, the subsequent processes may be performed for each prediction unit according to a direction from left to right or from top to bottom.

First, the decoder parses a merge flag 'merge_flag' for the current prediction block (S1905).

'merge_flag' specifies whether an inter prediction parameter for the current prediction unit is induced from a neighbor inter-predicted part (or block). In other words, 'merge_flag' specifies whether the aforementioned merge mode is applied for predicting the current prediction unit.

When the merge mode is applied as the result of 'merge_flag' in step S1905, the decoder parses a merge index ('merge_index') (S1906).

'merge_idx' indicates the merging candidate index of the merging candidate list. That is, as in the example of FIG. 7 above, the encoder configures the merging candidate list for the current prediction unit and signals to the decoder the merge candidate index 'merge_idx' for specifying the candidate block information selected by performing the motion estimation. The decoder may configure the merge candidate list in the same scheme as the encoder and identify the candidate block specified by the merge candidate index. In addition, the reference picture index and the motion vector of the current prediction unit may be derived from the motion information of the identified candidate block. In addition, the prediction block of the current prediction unit may be generated by using the derived reference picture index and motion vector. In this case, unlike the aforementioned skip mode, the residual block for the current prediction unit may be signaled from the encoder and the residual block and the prediction block are summed to generate the reconstructed block.

Thereafter, the decoder determines whether the current prediction unit is a last prediction unit (S1914).

In addition, as a result of determination in step S1914, when the current prediction unit is the last prediction unit, a process of parsing the syntax element of the current coding unit is ended. On the contrary, as the result of the determination in step S1914, when the current prediction unit is not the last prediction unit, the process is branched to the previous step of step S1905 above (partition loop) and step S1905 is first performed.

Meanwhile, when the merge mode is not applied as the result of parsing 'merge_flag' in step S1505, the decoder parses an inter prediction index 'inter_pred_idc' (S1907).

'inter_pred_idc' may indicate whether a list 0 uni-directional prediction PRED_L0, a list 1 uni-directional prediction PRED_L1, a bi-directional prediction PRED_BI or a bi-directional prediction PRED_BI_MIXED having a different partitioning mode for each reference picture is applied to the current prediction unit.

The decoder determines condition 1 (cond1) (S1908).

Here, the condition 1 (cond1) may include whether the current prediction unit (or prediction unit) is a bi-directional prediction mode having different partitioning modes (for example, if (inter_pred_idc==PRED_BI_MIXED)).

As a result of determination in step S1908, when the current prediction unit (or prediction unit) adopts the bi-directional prediction mode PRED_BI_MIXED having different partitioning modes, the decoder parses the second partitioning mode part_mode_2nd (S1909).

'part_mode_2nd' indicates the partitioning mode of the L1 reference picture for the current coding unit.

For example, 'part_mode_2nd' may be defined similarly to Table 1 above, defined as a part of Table 1, or defined to be include other partitioning modes together with Table 1. Further, 'part_mode_2nd' may be defined as described in Embodiments 1 to 7.

As such, when part_mode_2nd exists (i.e., signaled from the encoder), 'part_mode' may indicate the partitioning mode of the L0 reference picture for the current coding unit and part_mode_2nd may indicate the partitioning mode of the L1 reference picture for the current coding unit.

By 'inter_pred_idc', 'part_mode_2nd' exists only when the L0 partitioning mode and the L1 partitioning mode are different from each other, and the decoder parses all bi-directional motion information for the corresponding coding unit. That is, the decoder parses all motion information for the respective prediction units partitioned from the current coding unit.

The decoder determines whether part_mode_2nd indicates (that is, whether SIZE_2N×2N is true) (S1910).

When part_mode_2nd does not indicate 2N×2N, that is, part_mode_2nd indicates the partitioning mode other than 2N×2N, a flag (e.g., mode_available_idx) indicating whether each partitioning mode is available is parsed (S1911).

When the partitioning mode is divided into two prediction units of 2N×N and N×2N by part_mode_2nd, an index indicating that each prediction unit is available may have values of 0 and 1 and when the partitioning mode is divided into four prediction units, the index indicating that each prediction unit is available may have values of 0, 1, 2, and 3. For example, when part_mode_2nd is 2N×N and mode_available_idx is 0, it is indicated that a first prediction unit is available (that is, the bi-directional prediction is available). That is, the bi-directional prediction is performed with respect to the first prediction unit area and a second prediction unit indicates that the uni-directional prediction is performed and this is the same as the meaning of 2N×N_0 of Embodiment 5. Similarly, when part_mode_2nd is 2N×N, if mode_available_idx is 1, it is indicated that the second prediction unit is available and it is indicated that the first prediction unit is not available. That is, this is the same as the meaning of 2N×N_1 of Embodiment 5.

In this case, mode_available_idx may indicate one prediction unit, but may indicate a plurality of prediction units.

In addition, the decoder performs steps S1912 and S1913.

Meanwhile, when part_mode_2nd indicates 2N×2N in step S1910, the decoder immediately performs steps S1912 and S1913.

The decoder parses the motion information for each L0 prediction unit partitioned by 'part_mode' (S1912). That is, the decoder parses an L0 reference picture index 'ref_idx_l0', a motion vector difference mvd, and an L0 motion vector predictor flag 'mvp_l0_flag' for each L0 prediction unit partitioned by 'part_mode'. For example, the decoder may parse the motion information of the second L0 prediction unit by parsing the motion information of the first L0 prediction unit and branching the process to the previous step of S1912 (partition loop).

In this case, in a case where the L0 prediction unit is 2N×2N when the current coding unit is 2N×2N, step S1912 may not be repeatedly performed with respect to the L0 prediction unit (that is, performed once without applying the partition loop).

The decoder parses the motion information for each L1 prediction unit partitioned by 'part_mode_2nd' (S1913). That is, the decoder parses an L1 reference picture index 'ref_idx_l1', a motion vector difference mvd, and an L1 motion vector predictor flag 'mvp_l1_flag' for each L1 prediction unit partitioned by 'part_mode_2nd'.

In this case, the decoder may perform step S1913 only with respect to the area of the prediction unit indicated by mode_available_idx in step S1911 above. The decoder may not perform step S1913 with respect to other areas.

When mode_available_idx indicates the plurality of prediction units, the decoder may parse the motion information of the second L1 prediction unit by parsing the motion information of the first L1 prediction unit and branching the process to the previous step of S1913.

In this case, in the case where the L1 prediction unit is 2N×2N or mode_available_idx indicates only the area of one prediction unit when the current coding unit is 2N×2N, step S1913 may not be repeatedly performed with respect to the L1 prediction unit (that is, performed once without applying the partition loop).

'ref_idx_lx' (x=0, 1) indicates the reference picture index of the reference list (L0 or L1) for the current prediction unit.

'mvp_lx_flag' indicates the motion vector predictor index in the motion vector predictor candidate list of the reference list (L0 or L1) for the current prediction unit. The motion vector corresponding to the motion vector predictor index indicated by 'mvp_Ix_flag' may be derived as the motion vector predictor for the current predicted unit.

The motion vector difference mvd indicates a difference of the motion vector for the current prediction unit and the motion vector predictor. That is, the motion vector difference mvd indicates a value acquired by subtracting the motion vector predictor of the current prediction unit derived by 'mvp_Ix_flag' from the motion vector of the current prediction unit.

When the AMVP mode is applied as such, the encoder may configure the motion vector predictor candidate list for the current prediction unit as in the example of FIG. 7 above and signal to the decoder a selected motion vector predictor flag 'mvp_IX_flag' selected by performing the motion estimation, a difference mvd between the motion vector of the current prediction unit and the motion vector predictor indicated by the motion vector predictor flag, and the reference picture index. The decoder may configure the motion vector predictor candidate list in the same scheme as the encoder and derive the motion vector predictor indicated by the motion vector predictor flag. In addition, the derived motion vector predictor and the received motion vector difference mvd are added to derive the motion vector of the current prediction unit. In addition, the prediction block of the current prediction unit may be generated by using the reference picture index and the motion vector.

In FIG. 19, an example in which the motion information for the L0 prediction unit is parsed and the motion information for the L1 prediction unit is parsed is illustrated, but a parsing order of the motion information for the L0 prediction unit and the L1 prediction unit may be transformed to various combinations described below.

When the motion information of both the L0 prediction unit partitioned by 'part_mode' and the motion information of the L1 prediction unit which is available, which is indicated by 'part_mode_2nd' are parsed, the parsing process of the syntax element of the current coding unit is ended.

On the contrary, as a result of determination in step S1908, when the current coding unit (or prediction unit) does not adopt the bi-directional prediction mode PRED_BI_MIXED having different partitioning modes, the decoder parses the uni-directional or bi-directional motion information of the current prediction unit (S1914 and S1915).

That is, the decoder parses a reference picture index 'ref_idx_Ix' (x=0, 1), a motion vector difference mvd, and a motion vector predictor flag 'mvp_Ix_flag' (x=0, 1) of the current prediction unit partitioned by 'part_mode' (S1914 and S1915).

In this case, when the uni-directional prediction is applied to the current prediction unit, step S1914 or step S1915 is performed according to the direction (i.e., whether the L0 reference picture is used or the L1 reference picture is used).

On the other hand, when the bi-directional prediction is applied to the current prediction unit, steps S1914 and S1915 are performed.

Thereafter, the decoder determines whether the current prediction unit is the last prediction unit (S1916).

In addition, as a result of determination in step S1916, when the current prediction unit is the last prediction unit, a process of parsing the syntax element of the current coding unit is ended. On the contrary, as the result of the determination in step S1916, when the current prediction unit is not the last prediction unit, the process is branched to the previous step of step S1915 above (partition loop) and step S1905 is first performed.

Embodiment 7

When part_mode_2nd is applied to a chroma signal, the same mode as the luma signal or the same mode as part_mode may be determined.

Further, the chroma signal may be limited or changed as follows.

Table 12 shows application of the chroma of part_mode_2nd in a case where part_mode_2nd has a sub-partitioning meaning.

TABLE 12

| part_mode | 2N × N | | | |
|---|---|---|---|---|
| part_mode_2nd (LUMA) | 2N × N | 2N × nU | 2N × nD | N × N |
| part_mode_2nd (CHROMA) | 2N × 2N | 2N × N | 2N × N | N × N |

Table 12 shows a case where different modes are applied to the luma signal and the chroma signal when part_mode_2nd has the meaning of sub-partitioning. In a case where part_mode is 2N×N, and as a result, part_mode_2nd is determined as 2N×N as an example, the chroma signal corresponding thereto may be partitioned into the same shape as 2N×2N, that is, part_mode. Further, when part_mode_2nd is determined as N×N, the chroma signal also becomes N×N to be partitioned into the same shape as the luma signal.

Table 12 shows only one example of part_mode_2nd applied to the luma component and part_mode_2nd applied to the chroma component according to part_mode and the present invention is not limited thereto, but part_mode_2nd applied to the luma component and part_mode_2nd applied to the chroma component according to part_mode may be variously determined.

Table 13 shows application of the chroma signal of part_mode_2nd in a case where part_mode_2nd means that only some areas are available.

TABLE 13

| part_mode | 2N × N | | | |
|---|---|---|---|---|
| part_mode_2nd (LUMA) | 2N × 2N | 2N × N_0 | 2N × N_1 | N × N_0 |
| part_mode_2nd (CHROMA) | 2N × 2N | 2N × 2N | 2N × 2N | 2N × N_0 |

Table 13 shows a case where different modes are applied to the luma signal and the chroma signal when part_mode_2nd means that only some areas are available. In a case where part_mode is 2N×N, and as a result, part_mode_2nd is determined as 2N×N_0 as an example, a mode may be selected in which the chroma signal corresponding thereto is not partitioned into 2N×2N.

Table 13 shows only one example of part_mode_2nd applied to the luma component and part_mode_2nd applied to the chroma component according to part_mode and the present invention is not limited thereto, but part_mode_2nd applied to the luma component and part_mode_2nd applied to the chroma component according to part_mode may be variously determined.

FIG. 20 is a diagram illustrating an inter prediction method according to an embodiment of the present invention.

Referring to FIG. 20, the decoder derives motion information of a first prediction unit determined by the first partitioning mode of the current block and motion information of a second prediction unit determined by the second partitioning mode of the current block (S2001).

The decoder may derive the motion information for each first prediction unit and derive the motion information for each second prediction unit as illustrated in Embodiments 1 to 7 above.

In this case, examples of the first partitioning mode and the second partitioning mode may be part_mode and part_mode_2nd described above, respectively. As described above, part_mode may be any one of the partitioning modes shown in Table 1 above and part_mode_2nd may be a partitioning mode other than part_mode among the partitioning modes shown in Table 1 above. Further, part_mode_2nd may be the partitioning mode defined in Embodiments 1 to 7 described above.

A most probable mode (MPM) for the second partitioning mode may be configured based on the first partitioning mode and the second partitioning mode may be determined as a specific partitioning mode in the MPM list by a value (or index) indicating the second partitioning mode from the encoder.

In this case, a type and/or an order of a partitioning mode included the MPM list is determined according to at least any one of the first partitioning mode of the current block, the first partitioning mode of the neighbor block of the current block, and the second partitioning mode of the neighbor block of the current block.

Further, a candidate partitioning mode for the second partitioning mode may be limited to a smaller number than the candidate partitioning mode for the first partitioning mode.

In addition, the MPM list may be configured to include a new partitioning mode (N_mode) proposed by the present invention. N_mode is a partitioning mode to partition a block using a line segment connecting one or more points among vertexes of the current block and one or more points determined on a side of the current block according to the first partitioning mode as illustrated in FIG. 14 above. Further, N_mode may correspond to a partitioning mode to partition a block by using at least one of partitioning lines of the current block according to the first partitioning mode and one additional partitioning line as illustrated in FIG. 15 above.

In addition, the second partitioning mode may be determined so that a width of a block partitioned from the current block is the same as that of the neighbor block adjacent to an upper side of the current block and a height of the block partitioned from the current block is the same as that of the neighbor block adjacent to a left side of the current block as illustrated in FIG. 16 above.

Further, the second partitioning mode may mean the sub-partitioning and, in this case, each of the blocks partitioned from the current block according to the first partitioning mode may be partitioned by the second partitioning mode.

In addition, the second partitioning mode may mean that the partitioned blocks are available (that is, the bi-directional prediction is available) and in this case, the second partitioning mode may indicate a block in which the bi-directional prediction is available among the blocks partitioned according to the partitioning mode of the current block and the second partitioning mode.

Further, the first partitioning mode may indicate a partitioning mode applied to inter prediction that refers to the L0 reference picture and the second partitioning mode may indicate a partitioning mode applied to inter prediction which refers to the L1 reference picture. In addition, the first partitioning mode may indicate a partitioning mode for a reference picture in which a distance between a current picture and a reference picture is relatively small and the second partitioning mode may indicate a partitioning mode for a reference picture in which the distance between the current picture and the reference picture is relatively large.

Further, the second partitioning mode applied to the luma component and the chroma component of the current block may be independently determined as in Embodiment 7 above.

The decoder generates the prediction block of the first prediction unit using the motion information of the first prediction unit and generates the prediction block of the second prediction unit using the motion information of the second prediction unit (S2002).

In this case, the first prediction block may be generated using the motion information of the first prediction unit from the reference picture (L0 reference picture) of the reference picture list 0 and the second prediction block may be generated using the motion information of the second prediction unit from the reference picture (L1 reference picture) of the reference picture list 1. Further, as described above, the first prediction block may be generated using the motion information of the first prediction unit from the reference picture (L1 reference picture) of the reference picture list 1 and the second prediction block may be generated using the motion information of the second prediction unit from the reference picture (L0 reference picture) of the reference picture list 0.

The prediction block of the current block is generated in a sub-prediction unit determined by combining the first prediction unit and the second prediction unit using the first prediction block and the second prediction block (S2003).

That is, the sub-prediction unit of the current block may be determined by combining the plurality of partitioning modes. In addition, the prediction block of the sub-prediction unit may be generated by averaging or weighting a portion corresponding to the sub-prediction unit in the first prediction block and a portion corresponding to the sub-prediction unit in the second prediction block. In addition, the prediction block of the current block may be generated by merging the prediction blocks of each sub-prediction unit.

FIG. 21 is a diagram illustrating an inter prediction unit according to an embodiment of the present invention.

In FIG. 21, for convenience of description, inter prediction units 181 (see FIG. 1) and 261 (see FIG. 2) is illustrated as one block, but the inter prediction units 181 and 261 may be implemented by a configuration included in the encoder and/or the decoder.

Referring to FIG. 21, the inter prediction units 181 and 261 implement the functions, procedures, and/or methods proposed in FIGS. 5 to 20 above. Specifically, the inter prediction units 181 and 261 may be configured to include a motion information derivation unit 2103 and a prediction block generation unit 2104. In addition, the inter prediction units 181 and 261 may be configured to further include a partitioning mode derivation unit 2101 and a prediction direction determination unit 2102.

The partitioning mode derivation unit 2101 derives a plurality of partitioning modes applied to the current block based on partitioning mode information on the current block received from the encoder.

The prediction direction determination unit 2101 determines an inter prediction direction of the current block based on the inter prediction direction information (e.g., inter_pred_idc) of the current block received from the encoder.

The motion information derivation unit 2102 derives motion information of the first prediction unit determined by the first partitioning mode of the current block and motion information of the second prediction unit determined by the second partitioning mode of the current block.

The motion information derivation unit 2102 may derive the motion information for each first prediction unit and derive the motion information for each second prediction unit as illustrated in the embodiments above.

In this case, examples of the first partitioning mode and the second partitioning mode may be part_mode and part_mode_2nd described above, respectively. As described above, part_mode may be any one of the partitioning modes shown in Table 1 above and part_mode_2nd may be a partitioning mode other than part_mode among the partitioning modes shown in Table 1 above. Further, part_mode_2nd may be the partitioning mode defined in Embodiments 1 to 7 described above.

The partitioning mode derivation unit 2101 may configure the most probable mode (MPM) list for the second partitioning mode based on the first partitioning mode. In addition, the second partitioning mode may be derived from the MPM candidate list by a value (or index) indicating the second partitioning mode from the encoder.

In this case, a type and/or an order of a partitioning mode included the MPM list is determined according to at least any one of the first partitioning mode of the current block, the first partitioning mode of the neighbor block of the current block, and the second partitioning mode of the neighbor block of the current block.

Further, a candidate partitioning mode for the second partitioning mode may be limited to a smaller number than the candidate partitioning mode for the first partitioning mode.

In addition, the MPM list may be configured to include a new partitioning mode (N_mode) proposed by the present invention. N_mode is a partitioning mode to partition a block using a line segment connecting one or more points among vertexes of the current block and one or more points determined on a side of the current block according to the first partitioning mode as illustrated in FIG. 14 above. Further, N_mode may correspond to a partitioning mode to partition a block by using at least one of partitioning lines of the current block according to the first partitioning mode and one additional partitioning line as illustrated in FIG. 15 above.

In addition, the second partitioning mode may be determined so that a width of a block partitioned from the current block is the same as that of the neighbor block adjacent to an upper side of the current block and a height of the block partitioned from the current block is the same as that of the neighbor block adjacent to a left side of the current block as illustrated in FIG. 16 above.

Further, the second partitioning mode may mean the sub-partitioning mode and, in this case, each of the blocks partitioned from the current block according to the first partitioning mode may be partitioned by the second partitioning mode.

In addition, the second partitioning mode may mean that the partitioned blocks are available (that is, the bi-directional prediction is available) and in this case, the second partitioning mode may indicate a block in which the bi-directional prediction is available among the blocks partitioned according to the partitioning mode of the current block and the second partitioning mode.

Further, the first partitioning mode may indicate a partitioning mode applied to inter prediction that refers to the L0 reference picture and the second partitioning mode may indicate a partitioning mode applied to inter prediction which refers to the L1 reference picture. In addition, the first partitioning mode may indicate a partitioning mode for a reference picture in which a distance between a current picture and a reference picture is relatively small and the second partitioning mode may indicate a partitioning mode for a reference picture in which the distance between the current picture and the reference picture is relatively large.

Further, the second partitioning mode applied to the luma component and the chroma component of the current block may be independently determined as in Embodiment 7 above.

The motion information derivation unit 2103 generates a prediction block of the first prediction unit using the motion information of the first prediction unit, and generates a prediction block of the second prediction unit using the motion information of the second prediction unit.

In this case, the motion information derivation unit 2103 may generate the first prediction block using the motion information from the reference picture (L0 reference picture) of the reference picture list 0 and generate the second prediction block using the motion information from the reference picture (L1 reference picture) of the reference picture list 1. Further, as described above, the motion information derivation unit 2103 may generate the first prediction block using the motion information of the first prediction unit from the reference picture (L1 reference picture) of the reference picture list 1 and generate the second prediction block using the motion information of the second prediction unit from the reference picture (L0 reference picture) of the reference picture list 0.

The prediction block generation unit 2104 generates the prediction block of the current block in the sub-prediction unit determined by combining the first prediction unit and the second prediction unit using the first prediction block and the second prediction block.

That is, the prediction block generation unit 2104 may determine the sub-prediction unit of the current block by combining the plurality of partitioning modes. In addition, the prediction block of the sub-prediction unit may be generated by averaging or weighting a portion corresponding to the sub-prediction unit in the first prediction block and a portion corresponding to the sub-prediction unit in the second prediction block. Further, the prediction block of the current block may be generated by merging the prediction blocks of each sub-prediction unit.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

Hereinabove, the preferred embodiments of the present invention are disclosed for an illustrative purpose and hereinafter, modifications, changes, substitutions, or additions of various other embodiments will be made within the technical spirit and the technical scope of the present invention disclosed in the appended claims by those skilled in the art.

The invention claimed is:

1. An image decoding method comprising:
obtaining, by a processor, a first syntax element related to a first partitioning mode partitioning a current block and a second syntax element related to a second partitioning mode partitioning the current block;
deriving, by the processor, motion information of a first prediction unit determined by the first partitioning mode which is determined based on the first syntax element;
configuring, by the processor, a most probable mode (MPM) list comprising a plurality of partitioning modes different from the first partitioning mode;
deriving, by the processor, motion information of a second prediction unit determined by the second partitioning mode which is determined within the MPM list based on the second syntax element;
generating, by the processor, a first prediction block of the first prediction unit by using the motion information of the first prediction unit and generating a second prediction block of the second prediction unit by using the motion information of the second prediction unit; and
generating, by the processor, a prediction block of the current block in units of sub-prediction unit determined by combining the first prediction unit and the second prediction unit by using the first prediction block and the second prediction block.

2. The image decoding method of claim 1, wherein types and/or an order of the plurality of partition modes included the MPM list are determined according to at least any one of the first partitioning mode of the current block, the first partitioning mode of a neighbor block of the current block, and the second partitioning mode of the neighbor block of the current block.

3. The image decoding method of claim 1, wherein a candidate partitioning mode for the second partitioning mode is limited to a smaller number than the candidate partitioning mode for the first partitioning mode.

4. The image decoding method of claim 1, wherein the first partitioning mode is any one of 2N×2N, 2N×N, N×2N, N×N, 2N×nU, 2N×nD, nL×2N, and nR×2N and the second partitioning mode is any one of partitioning modes different from the first partitioning mode.

5. The image decoding method of claim 1, wherein the MPM list includes a predetermined partitioning mode N_mode, and
the N_mode is a partitioning mode to partition a block using a line segment connecting one or more points among vertexes of the current block and one or more points determined on a side of the current block according to the first partitioning mode.

6. The image decoding method of claim 1, wherein the MPM list includes a predetermined partitioning mode N_mode, and
the N_mode is a partitioning mode to partition a block by using at least one of partitioning lines of the current block according to the first partitioning mode and one additional partitioning line.

7. The image decoding method of claim 1, wherein the second partitioning mode is determined so that a width of a block partitioned from the current block is the same as that of the neighbor block adjacent to an upper side of the current block and a height of the block partitioned from the current block is the same as that of the neighbor block adjacent to a left side of the current block.

8. The image decoding method of claim 1, wherein the second partitioning mode indicates a block in which bi-directional prediction is available among the blocks partitioned according to a partitioning type of the current block and the second partitioning mode.

9. The image decoding method of claim 1, wherein the second partitioning mode applied to a luma component and a chroma component of the current block is independently determined.

10. The image decoding method of claim 1, wherein the first partitioning mode indicates a partitioning mode applied to inter prediction that refers to a reference picture in a reference picture list 0 and the second partitioning mode indicates a partitioning applied to inter prediction which refers to a reference picture in a reference picture list 1.

11. The image decoding method of claim 1, wherein the step of obtaining the first syntax element the second syntax element further comprises obtaining a third syntax element related to a prediction direction, and
wherein the second syntax element is obtained only when the third syntax element indicates that different partitioning modes are applied to the current block for each reference picture in bi-directional prediction.

12. An image encoding method comprising:
generating, by a processor, first motion information of a first prediction unit determined by a first partitioning mode;

configuring, by the processor, a most probable mode (MPM) list comprising a plurality of partitioning modes different from the first partitioning mode;

generating, by the processor, second motion information of a second prediction unit determined by a second partitioning mode selected within the MPM list;

generating, by the processor, a first syntax element related to the first partitioning mode partitioning a current block and a second syntax element related to the second partitioning mode partitioning the current block;

generating, by the processor, a first prediction block of the first prediction unit by using the first motion information and generating a second prediction block of the second prediction unit by using the second motion information;

generating, by the processor, a prediction block of the current block in units of sub-prediction unit determined by combining the first prediction unit and the second prediction unit by using the first prediction block and the second prediction block; and generating, by the processor, a residual block of the current block based on the prediction block of the current block.

13. A transmission method for data comprising a bitstream for an image, the method comprising:

obtaining, by a processor, the bitstream for the image; and transmitting, by the processor, the data of the bitstream, wherein the bitstream is generated by performing the steps of:

generating, by the processor, first motion information of a first prediction unit determined by a first partitioning mode;

configuring, by the processor, a most probable mode (MPM) list comprising a plurality of partitioning modes different from the first partitioning mode;

generating, by the processor, second motion information of a second prediction unit determined by a second partitioning mode selected within the MPM list;

generating, by the processor, a first syntax element related to the first partitioning mode partitioning a current block and a second syntax element related to the second partitioning mode partitioning the current block;

generating, by the processor, a first prediction block of the first prediction unit by using the first motion information and generating a second prediction block of the second prediction unit by using the second motion information;

generating, by the processor, a prediction block of the current block in units of sub-prediction unit determined by combining the first prediction unit and the second prediction unit by using the first prediction block and the second prediction block; and generating, by the processor, a residual block of the current block based on the prediction block of the current block.

* * * * *